US010766033B2

(12) United States Patent
Bao et al.

(10) Patent No.: US 10,766,033 B2
(45) Date of Patent: Sep. 8, 2020

(54) DROPLET GENERATION IN A MICROFLUIDIC DEVICE HAVING AN OPTOELECTROWETTING CONFIGURATION

(71) Applicant: BERKELEY LIGHTS, INC., Emeryville, CA (US)

(72) Inventors: X. Robert Bao, Emeryville, CA (US); Jason M. McEwen, El Cerrito, CA (US); Brian A. Rabkin, Emeryville, CA (US)

(73) Assignee: BERKELEY LIGHTS, INC., Emeryville, CA (US)

( * ) Notice: Subject to any disclaimer, the term of this patent is extended or adjusted under 35 U.S.C. 154(b) by 225 days.

(21) Appl. No.: 16/024,624

(22) Filed: Jun. 29, 2018

(65) Prior Publication Data

US 2019/0060907 A1    Feb. 28, 2019

Related U.S. Application Data

(63) Continuation of application No. PCT/US2016/069579, filed on Dec. 30, 2016.

(60) Provisional application No. 62/273,172, filed on Dec. 30, 2015.

(51) Int. Cl.
*G01N 35/10* (2006.01)
*B01L 3/00* (2006.01)
*G01N 35/00* (2006.01)

(52) U.S. Cl.
CPC ... *B01L 3/502792* (2013.01); *B01L 3/502784* (2013.01); *G01N 35/10* (2013.01); *B01L 2200/0673* (2013.01); *B01L 2400/0427* (2013.01); *B01L 2400/0496* (2013.01); *G01N 2035/00237* (2013.01); *G01N 2035/1034* (2013.01)

(58) Field of Classification Search
CPC ..... B01L 2200/0673; B01L 2400/0427; B01L 2400/0496; B01L 3/502784; B01L 3/502792; G01N 2035/00237; G01N 2035/1034; G01N 35/10
See application file for complete search history.

(56) References Cited

U.S. PATENT DOCUMENTS

| 6,383,233 B1 | 5/2002 | Reuter |
| 8,685,344 B2 | 4/2014 | Sudarsan et al. |
| 2003/0149426 A1 | 8/2003 | Yee et al. |

(Continued)

FOREIGN PATENT DOCUMENTS

WO    WO2015/164847 A1    10/2015

OTHER PUBLICATIONS

Pei; Optofluidic Devices for Droplet and Cell Manipulation; May 15, 2015; 70 pgs.; retreived from the internet on Apr. 11, 2017 (https://www.researchgate.net/publication/283351186_Optofluidic_Devices_for_Droplet_and_Cell_Manipulation).

(Continued)

*Primary Examiner* — Jennifer Wecker
(74) *Attorney, Agent, or Firm* — Shay Glenn LLP

(57) ABSTRACT

Systems and methods are described herein for improved droplet generation within microfluidic apparatuses. Electrowetting forces of varying configurations may be used to separate droplets from a fluidic reservoir in a reproducible and rapid manner. In many embodiments, separation of droplets from the fluidic reservoir is performed without the use of highly specialized surfactants.

26 Claims, 13 Drawing Sheets

(56) References Cited

U.S. PATENT DOCUMENTS

| | | |
|---|---|---|
| 2003/0224528 A1 | 12/2003 | Chiou et al. |
| 2008/0014589 A1 | 1/2008 | Link et al. |
| 2010/0000620 A1 | 1/2010 | Fouillet et al. |
| 2012/0024708 A1* | 2/2012 | Chiou ............... B01L 3/502792 204/643 |
| 2013/0026040 A1 | 1/2013 | Cheng et al. |
| 2013/0288254 A1 | 10/2013 | Pollack et al. |
| 2013/0319861 A1 | 12/2013 | Khandros et al. |
| 2015/0027892 A1 | 1/2015 | Miller et al. |
| 2016/0158748 A1 | 6/2016 | Wu et al. |
| 2017/0043343 A1 | 2/2017 | Khandros et al. |
| 2017/0173580 A1 | 6/2017 | Lowe et al. |

OTHER PUBLICATIONS

Pei et al.; Light-Actuated Digital Microfluidics for Largescale, Parallel Manipulation Of Arbitrarily Sized Droplets; 2010 IEEE 23rd Int'l. Conf. on Micro. Electro. Mech. Sys.; 4 pages; Jan. 2010.

Ren et al.; Automated On-Chip Droplet Dispensing With Volume Control by Electro-Wetting Actuation and Capacitance Metering; Sensors and Actuators B; 98; pp. 319-327; Mar. 15, 2004.

Pei et al.; On-Chip Blade for Accurate Splitting Of Droplets in Light-Actuated Digital Microfluidics; International Conference on Miniaturized Systems for Chemistry and Life Sciences; pp. 341-343; Sep. 2012.

Gong et al.; All-Electronic Droplet Generation On-Chip with Real-Time Feedback Control for EWOD Digital Microfluidics; Lab on a Chip; 8(6); 20 pages; Jun. 2006.

Valley et al.; A Unified Platform for Optoelectrowetting and Optoelectronic Tweezers; Lab Chip; 11(7); pp. 1292-1297; Jan. 2011.

International Search Report and Written Opinion of PCT App. PCT/US2016/069579 dated May 4, 2017; 8 pages.

Pei; Optofluidic Devices for Droplet and Cell Manipulation; May 15, 2015; 109 pgs.; retreived from the internet on Apr. 11, 2017 (https://www.researchgate.net/publication/283351186_Optofluidic_Devices_for_Droplet_and_Cell_Manipulation).

* cited by examiner

DROPLET GENERATION IN A MICROFLUIDIC DEVICE HAVING AN OPTOELECTROWETTING CONFIGURATION

This application is a continuation of International Application No. PCT/US2016/069579, filed Dec. 30, 2016, which claims the benefit under 35 U.S.C. 119(e) of U.S. Provisional Application No. 62/273,172, filed Dec. 30, 2015, the contents of which are incorporated herein by reference in their entirety.

FIELD OF THE INVENTION

The present invention relates to methods of generating droplets of aqueous solution within a microfluidic device having an optoelectrowetting configuration.

BACKGROUND

Micro-objects, such as biological cells, can be processed in microfluidic apparatuses. To facilitate such processing, droplets containing micro-objects or reagents used to process the micro-objects must be generated in a reliable and consistent manner. Present solutions for droplet generation are limited by the need for expensive, highly specialized surfactants. In addition, the droplets are typically produced continuously, at a high rate that complicates the subsequent movement and use of the droplets. Consequently, a need exists for improved methods of droplet generation that avoid the use of expensive surfactants and allow flexibility with regard to the timing and rate of droplet production.

SUMMARY OF THE INVENTION

In a first aspect, a method is provided for generating a droplet in a microfluidic device including a substrate and an optoelectrowetting (OEW) configuration, the method including: applying an electrowetting (EW) force to a droplet reservoir disposed within the microfluidic device, wherein the droplet reservoir includes an aqueous fluid, projecting an optical droplet actuator onto a first position on a surface of the substrate of the microfluidic device, where the first position overlaps at least partially with a position on the surface of the substrate that is in contact with the aqueous fluid of the droplet reservoir; and moving the projection of the optical droplet actuator to a second position on the surface of the substrate of the microfluidic device, where the second position is a sufficient distance away from the first position so as to cause a first droplet of the aqueous fluid to separate from the droplet reservoir, wherein, prior to moving the projection of the optical droplet actuator to the second position on the substrate, the droplet reservoir contains a volume of aqueous fluid equal to or greater than twice the volume of the first droplet. In various embodiments of the method for generating a droplet, the volume of the first droplet may be at least 1 nL. In other embodiments, the volume of the first droplet may be about 2 nL to about 10 nL. In various embodiments of the method for generating a droplet, applying an EW force to the droplet reservoir may include applying an OEW force. In other embodiments, applying an EW force to the droplet reservoir includes applying an EWOD force.

In another aspect, a method is provided for generating droplets in a microfluidic device including a substrate and an optoelectrowetting (OEW) configuration, the method including: applying an electrowetting (EW) force to a droplet reservoir disposed within the microfluidic device, where the droplet reservoir includes an aqueous fluid; projecting a first optical droplet actuator onto a first position on a surface of the substrate of the microfluidic device, where the first position overlaps at least partially with a position on the surface of the substrate that is in contact with the aqueous fluid of the droplet reservoir; moving the projection of the first optical droplet actuator to a second position on the surface of the substrate of the microfluidic device, where the second position is a sufficient distance away from the first position so as to cause a first droplet of the aqueous fluid to separate from the droplet reservoir; projecting a second optical droplet actuator onto a third position on the surface of the substrate of the microfluidic device, where the third position overlaps at least partially with a position on the surface of the substrate that is in contact with the aqueous fluid of the droplet reservoir; and moving the projection of the third optical droplet actuator to a fourth position on the surface of the substrate of the microfluidic device, where the fourth position is a sufficient distance away from the third position so as to cause a second droplet of the aqueous fluid to separate from the droplet reservoir, where the second droplet has substantially the same volume of aqueous fluid as the first droplet.

In a further aspect, a system is provided where the system is configured to generate droplets of aqueous fluid within a microfluidic device, the system including: a nest; a structured light modulator (SLM); an optical train; and a control module including a digital processor and a digital memory, where the nest is configured to support the microfluidic device; where the optical train is configured to receive light from the SLM and project an optical droplet actuator onto a surface of a substrate of the microfluidic device when the microfluidic device is supported by the nest; where the digital memory of the control module includes non-transitory machine readable instructions for carrying out the steps of any one of the methods of embodiments 1 to 38; and where the processor of the controller is configured to read the machine-readable instructions from the memory and, in accordance with the instructions, direct the SLM to project an optical droplet actuator onto a first position on a surface of a substrate of the microfluidic device and move the projection of the optical droplet actuator from the first position to a second position on the surface of the substrate of the microfluidic device.

In various embodiments of the system, the nest may be further configured to electrically couple with and apply an electrical potential across the microfluidic device. In other embodiments, the system may further include an imaging device configured to provide a digital image of at least a portion of the microfluidic device including a droplet reservoir.

DETAILED DESCRIPTION OF THE INVENTION

Figure 1A:
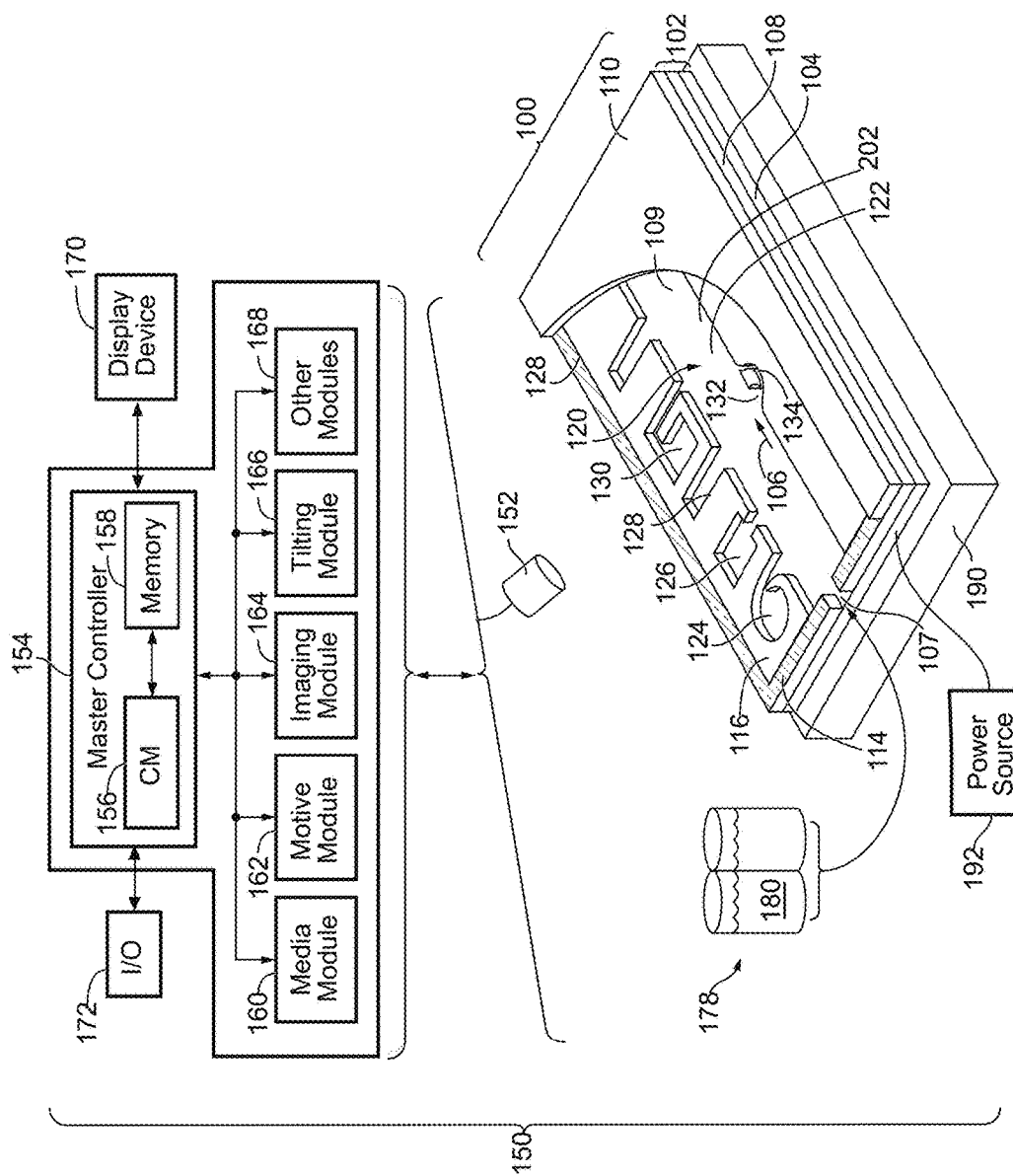
FIG. 1A illustrates a generalized microfluidic device and a system with associated control equipment for controlling and monitoring the microfluidic device, according to some embodiments of the invention.
Figure 1B:
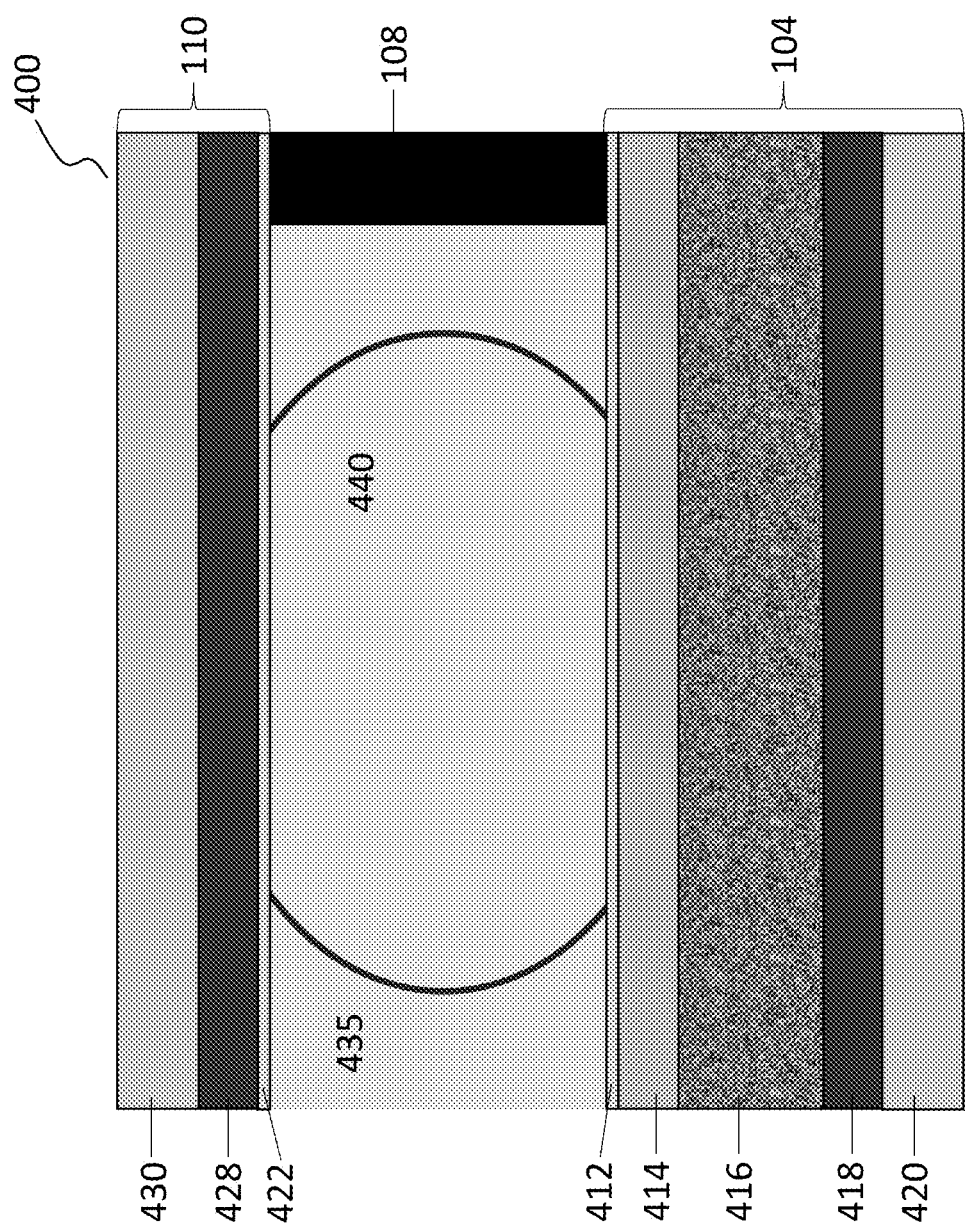
FIG. 1B is a vertical cross-sectional view of a microfluidic apparatus having a substrate, a cover, and a spacing element which together form an enclosure configured to hold a liquid medium and droplets of a liquid immiscible in the liquid medium. The substrate has an electrowetting configuration that allows the droplets to be manipulated within the enclosure.

This specification describes exemplary embodiments and applications of the invention. The invention, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axial/y-axial area.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one.

As used herein, the term "plurality" can be 2, 3, 4, 5, 6, 7, 8, 9, 10, or more.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow region(s), channel(s), chamber(s), and/or pen(s), and (for microfluidic device that include a cover) at least two ports configured to allow the fluid (and, optionally, micro-objects suspended in the fluid) to flow into and/or out of the microfluidic device. Typically, a microfluidic circuit of a microfluidic device will include at least one microfluidic channel and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 µL. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 µL.

As used herein, a "nanofluidic device" or "nanofluidic apparatus" is a type of microfluidic device having a microfluidic circuit that contains at least one circuit element configured to hold a volume of fluid of less than about 1 µL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 pL to 1 nL, 100 pL to 2 nL, 100 pL to 5 nL, 250 pL to 2 nL, 250 pL to 5 nL, 250 pL to 10 nL, 500 pL to 5 nL, 500 pL to 10 nL, 500 pL to 15 nL, 750 pL to 10 nL, 750 pL to 15 nL, 750 pL to 20 nL, 1 to 10 nL, 1 to 15 nL, 1 to 20 nL, 1 to 25 nL, or 1 to 50 nL. In other embodiments, one or more (e.g., all) of the at least one circuit elements is configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A "microfluidic channel" or "flow channel" as used herein refers to a flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is in the range of from about 50,000 microns to about 500,000 microns, including any range therebetween. In some embodiments, the horizontal dimension is in the range of from about 100 microns to about 1000 microns (e.g., about 150 to about 500 microns) and the vertical dimension is in the range of from about 25 microns to about 200 microns, e.g., from about 40 to about 150 microns. It is noted that a flow channel may have a variety of different spatial configurations in a microfluidic device, and thus is not restricted to a perfectly linear element. For example, a flow channel may include one or more sections having any of the following configurations: curve, bend, spiral, incline, decline, fork (e.g., multiple different flow paths), and any combination thereof. In addition, a flow channel may have different cross-sectional areas along its path, widening and constricting to provide a desired fluid flow therein.

As used herein, the term "obstruction" refers generally to a bump or similar type of structure that is sufficiently large so as to partially (but not completely) impede movement of target micro-objects between two different regions or circuit elements in a microfluidic device. The two different regions/circuit elements can be, for example, a microfluidic sequestration pen and a microfluidic channel, or a connection region and an isolation region of a microfluidic sequestration pen.

As used herein, the term "constriction" refers generally to a narrowing of a width of a circuit element (or an interface between two circuit elements) in a microfluidic device. The constriction can be located, for example, at the interface between a microfluidic sequestration pen and a microfluidic channel, or at the interface between an isolation region and a connection region of a microfluidic sequestration pen.

As used herein, the term "transparent" refers to a material which allows visible light to pass through without substantially altering the light as is passes through.

As used herein, the term "micro-object" refers generally to any microscopic object that may be isolated and collected in accordance with the present invention. Non-limiting examples of micro-objects include: inanimate micro-objects such as microparticles; microbeads (e.g., polystyrene beads, Luminex™ beads, or the like); magnetic beads; microrods; microwires; quantum dots, and the like; biological micro-objects such as cells (e.g., embryos, oocytes, ova, sperm cells, cells dissociated from a tissue, eukaryotic cells, protist cells, animal cells, mammalian cells, human cells, immunological cells, hybridomas, cultured cells, cells from a cell line, cancer cells, infected cells, transfected and/or transformed cells, reporter cells, prokaryotic cells, and the like); biological organelles; vesicles, or complexes; synthetic vesicles; liposomes (e.g., synthetic or derived from membrane preparations); lipid nanorafts (as described in Ritchie et al. (2009) "Reconstitution of Membrane Proteins in Phospholipid Bilayer Nanodiscs," Methods Enzymol., 464: 211-231), and the like; or a combination of inanimate micro-objects and biological micro-objects (e.g., microbeads attached to cells, liposome-coated micro-beads, liposome-coated magnetic beads, or the like). Beads may further have other moieties/molecules covalently or non-covalently attached, such as fluorescent labels, proteins, small molecule signaling moieties, antigens, or chemical/biological species capable of use in an assay.

As used herein, the term "maintaining (a) cell(s)" refers to providing an environment comprising both fluidic and gaseous components and, optionally a surface, that provides the conditions necessary to keep the cells viable and/or expanding.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result.

The phrase "substantially no flow" refers to a rate of flow of a fluidic medium that, averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a microfluidic device is an example of a swept region while an isolation region (described in further detail below) of a microfluidic device is an example of an unswept region.

As used herein, a "flow region" refers to one or more fluidically connected circuit elements (e.g. channel(s), region(s), chamber(s) and the like) that define, and are subject to, the trajectory of a flow of medium. A flow region is thus an example of a swept region of a microfluidic device. Other circuit elements (e.g., unswept regions) may be fluidically connected with the circuit elements that comprise the flow region without being subject to the flow of medium in the flow region.

As used herein, "alkyl" refers to a straight or branched hydrocarbon chain radical consisting solely of carbon and hydrogen atoms, containing no unsaturation, having from one to six carbon atoms (e.g., C1-C6 alkyl). Whenever it appears herein, a numerical range such as "1 to 6" refers to each integer in the given range; e.g., "1 to 6 carbon atoms" means that the alkyl group may consist of 1 carbon atom, 2 carbon atoms, 3 carbon atoms, etc., up to and including 6 carbon atoms, although the present definition also covers the occurrence of the term "alkyl" where no numerical range is designated. In some embodiments, it is a C1-C3 alkyl group. Typical alkyl groups include, but are in no way limited to, methyl, ethyl, propyl, isopropyl, n-butyl, iso-butyl, sec-butyl isobutyl, tertiary butyl, pentyl, isopentyl, neopentyl, hexyl, and the like. The alkyl is attached to the rest of the molecule by a single bond, for example, methyl (Me), ethyl (Et), n-propyl, 1-methylethyl (iso-propyl), n-butyl, n-pentyl, 1,1-dimethylethyl (t-butyl), hexyl, and the like.

Unless stated otherwise specifically in the specification, an alkyl group may be optionally substituted by one or more substituents which independently are: aryl, arylalkyl, heteroaryl, heteroarylalkyl, hydroxy, halo, cyano, trifluoromethyl, trifluoromethoxy, nitro, trimethylsilanyl, —OR', —SR', —OC(O)—R', —N(R')2, —C(O)R', —C(O)OR', OC(O)N(R')2, —C(O)N(R')2, —N(R')C(O)OR', —N(R')C(O)R', —N(R')C(O)N(R')2, N(R')C(NR')N(R')2, —N(R')S(O)tR' (where t is 1 or 2), —S(O)tOR' (where t is 1 or 2), S(O)tN(R')2 (where t is 1 or 2), or PO3(R')2 where each R' is independently hydrogen, alkyl, fluoroalkyl, aryl, aralkyl, heterocycloalkyl, or heteroaryl.

As referred to herein, a fluorinated alkyl moiety is an alkyl moiety having one or more hydrogens of the alkyl moiety replaced by a fluoro substituent. A perfluorinated alkyl moiety has all hydrogens attached to the alkyl moiety replaced by fluoro substituents.

As referred to herein, a "halo" moiety is a bromo, chloro, or fluoro moiety.

As referred to herein, an "olefinic" compound is an organic molecule which contains an "alkene" moiety. An alkene moiety refers to a group consisting of at least two carbon atoms and at least one carbon-carbon double bond. The non-alkene portion of the molecule may be any class of organic molecule, and in some embodiments, may include alkyl or fluorinated (including but not limited to perfluorinated) alkyl moieties, any of which may be further substituted.

As used herein, a "densely packed hydrophobic monolayer" refers to a single layer of hydrophobic molecules that are packed sufficiently close together so as to resist intercalation and/or intrusion of polar molecules, such as water, ions, and other charged species.

As used herein: "μm" (or "um") means micrometer; "μm³" means cubic micrometer; "pL" means picoliter, "nL" means nanoliter; and "μL" (or "uL") means microliter.

Methods of loading. Loading of micro-objects, such as biological micro-objects and/or beads, into different regions of a microfluidic device can involve the use of fluid flow, gravity, a dielectrophoresis (DEP) force, an electrowetting force, a magnetic force, or any combination thereof as described herein. The DEP force can be generated optically, such as by an optoelectronic tweezers (OET) configuration and/or electrically, such as by activation of electrodes/electrode regions in a temporal/spatial pattern. Similarly, the electrowetting force may be provided optically, such as by an opto-electro wetting (OEW) configuration and/or electrically, such as by activation of electrodes/electrode regions in a temporal spatial pattern.

Microfluidic devices and systems for operating and observing such devices. FIG. 1A illustrates a generalized example of a microfluidic device 100 and a system 150 which can be used to control the microfluidic device 100 and the movement of micro-objects and/or droplet therein. A perspective view of the microfluidic device 100 is shown having a partial cut-away of its cover 110 to provide a partial view into the microfluidic device 100. The microfluidic device 100 generally comprises a microfluidic circuit 120 comprising a flow region 106 through which a fluidic medium 180 can flow, optionally carrying one or more micro-objects (not shown) into and/or through the microfluidic circuit 120. Although a single microfluidic circuit 120 is illustrated in FIG. 1A, suitable microfluidic devices can include a plurality (e.g., 2 or 3) of such microfluidic circuits. Regardless, the microfluidic device 100 can be configured to be a nanofluidic device. In the embodiment illustrated in FIG. 1A, the microfluidic circuit 120 comprises a plurality of microfluidic sequestration pens 124, 126, 128, and 130, each having a single opening in fluidic communication with flow region 106. As discussed further below, the microfluidic sequestration pens comprise various features and structures that have been optimized for retaining micro-objects in the microfluidic device, such as microfluidic device 100, even when a medium 180 is flowing through the flow region 106. Before turning to the foregoing, however, a brief description of microfluidic device 100 and system 150 is provided.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. In certain embodiments, however, the enclosure 102 may lack the cover 110 and the microfluidic circuit 120 may be defined by the support structure 104 and the microfluidic circuit structure 108. The support structure 104, the microfluidic circuit structure 108, and (optionally) the cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and (optionally) the cover 110, the microfluidic circuit structure 108 can define the elements of the microfluidic circuit 120.

The support structure 104 can be at the bottom and the cover 110 at the top of the microfluidic circuit 120, as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A, but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow region 106.

The support structure 104 can comprise one or more electrodes (not shown) and a substrate or a plurality of interconnected substrates. The substrate can be any suitable substrate known in the art. For example, the support structure 104 can comprise one or more semiconductor substrates, each of which is electrically connected to at least one of the one or more electrodes (e.g., all or a subset of the semiconductor substrates can be electrically connected to a single electrode). Alternatively, the support structure 104 can comprise a printed circuit board assembly ("PCBA") which comprises the one or more electrodes. In still other embodiments, the support structure 104 can comprise a substrate (e.g., a semiconductor substrate) which is mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers, pens, traps, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material. Alternatively, the microfluidic circuit structure 108 can lack a frame. For example, the microfluidic circuit structure 108 can consist of or consist essentially of the microfluidic circuit material 116.

The microfluidic circuit material 116 can be patterned with cavities or the like to define circuit elements and interconnections of the microfluidic circuit 120. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can compose microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, the microfluidic circuit material 116 can be disposed on the support structure 104 and (optionally) inside the frame 114.

The cover 110 can be an integral part of the microfluidic circuit material 116 and/or the frame 114. Alternatively, the cover 110 can be a structurally distinct element, as illustrated in FIG. 1A. The cover 110 can comprise the same or different materials as the frame 114 and/or the microfluidic circuit material 116. Similarly, the support structure 104 can be a separate structure from the microfluidic circuit material 116 or the frame 114, as illustrated, or an integral part of the microfluidic circuit material 116 or frame 114. Likewise, the microfluidic circuit material 116 and the frame 114, if present, can be separate structures as shown in FIG. 1A or integral portions of the same structure.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. 2012/0325665 (Chiou et al.), the contents of which are incorporated herein by reference. In some embodiments, the cover 110 can be modified (e.g., by coating or conditioning all or part of a surface that faces inward toward the microfluidic circuit 120) to support droplet movement and/or cell adhesion, cell viability and/or cell growth. The modification may include a coating of a synthetic or natural polymer or a conditioned surface having covalently bound molecules (e.g., self-associating molecules). In some embodiments, the cover 110 and/or the support structure 104 can be transparent to light. The cover 110 may also include at least one material that is gas permeable (e.g., PDMS or PPS).

FIG. 1A also shows a system 150 for operating and controlling microfluidic devices, such as microfluidic device 100. System 150 includes an electrical power source 192, an imaging device 194 (not shown, but may be part of imaging module 164), and a tilting device 190 (not shown, but may be part of tilting module 166).

The electrical power source 192 can provide electric power to the microfluidic device 100 and/or tilting device 190, providing biasing voltages or currents as needed. The electrical power source 192 can, for example, comprise one or more alternating current (AC) and/or direct current (DC) voltage or current sources. The imaging device 194 can comprise a device, such as a digital camera, for capturing images inside microfluidic circuit 120. In some instances, the imaging device 194 further comprises a detector having a fast frame rate and/or high sensitivity (e.g. for low light applications). The imaging device 194 can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high pressure mercury lamp) or a Xenon arc lamp. As discussed with respect to FIG. 3B, the imaging device 194 may further include a microscope (or an optical train), which may or may not include an eyepiece.

System 150 further comprises a tilting device 190 configured to rotate a microfluidic device 100 about one or more axes of rotation. In some embodiments, the tilting device 190 is configured to support and/or hold the enclosure 102 comprising the microfluidic circuit 120 about at least one axis such that the microfluidic device 100 (and thus the microfluidic circuit 120) can be held in a level orientation (i.e. at 0° relative to x- and y-axes), a vertical orientation (i.e. at 90° relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, the tilting device 190 can tilt the microfluidic device 100 at 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90°, or any degree therebetween relative to the x-axis or the y-axis. The level orientation (and thus the x- and y-axes) is defined as normal to a vertical axis defined by the force of gravity. The tilting device can also tilt the microfluidic device 100 (and the microfluidic circuit 120) to any degree greater than 90° relative to the x-axis and/or y-axis, or tilt the microfluidic device 100 (and the microfluidic circuit 120) 180° relative to the x-axis or the y-axis in order to fully invert the microfluidic device 100 (and the microfluidic circuit 120). Similarly, in some embodiments, the tilting device 190 tilts the microfluidic device 100 (and the microfluidic circuit 120) about an axis of rotation defined by flow region 106/channel 122 or some other portion of microfluidic circuit 120.

In some instances, the microfluidic device 100 is tilted into a vertical orientation such that the flow region 106/channel 122 is positioned above or below one or more sequestration pens. The term "above" as used herein denotes that the flow region 106/channel 122 is positioned higher than the one or more sequestration pens on a vertical axis defined by the force of gravity (i.e. an object in a sequestration pen above a flow region 106/channel 122 would have a higher gravitational potential energy than an object in the flow region/channel). The term "below" as used herein denotes that the flow region 106/channel 122 is positioned lower than the one or more sequestration pens on a vertical axis defined by the force of gravity (i.e. an object in a sequestration pen below a flow region 106/channel 122 would have a lower gravitational potential energy than an object in the flow region/channel).

In some instances, the tilting device 190 tilts the microfluidic device 100 about an axis that is parallel to the flow region 106/channel 122. Moreover, the microfluidic device 100 can be tilted to an angle of less than 90° such that the flow region 106/channel 122 is located above or below one or more sequestration pens without being located directly above or below the sequestration pens. In other instances, the tilting device 190 tilts the microfluidic device 100 about an axis perpendicular to the flow region 106/channel 122. In still other instances, the tilting device 190 tilts the microfluidic device 100 about an axis that is neither parallel nor perpendicular to the flow region 106/channel 122.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 include a master controller 154, a media module 160 for controlling the media source 178, a motive module 162 for controlling movement and/or selection of micro-objects and/or medium (e.g., droplets of medium) in the microfluidic circuit 120, an imaging module 164 for controlling an imaging device 194 (e.g., a camera, microscope, light source or any combination thereof) for capturing images (e.g., digital images), and a tilting module 166 for controlling a tilting device 190. The control equipment 152 can also include other modules 168 for controlling, monitoring, or performing other functions with respect to the microfluidic device 100. As shown, the equipment 152 can be operatively coupled with (or further include) a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, tilting module 166, and/or other modules 168 configured as discussed above. Similarly, the master controller 154, media module 160, motive module 162, imaging module 164, tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow region 106/channel 122 inside the microfluidic circuit 120. For example, in some embodiments the media module 160 stops the flow of media 180 in the flow region 106/channel 122 and through the enclosure 102 prior to the loading of a micro-object or a bead into a sequestration pen (e.g., using gravity, electrowetting (EW) force, dielectrophoresis (DEP) force, or a combination thereof).

The motive module 162 can be configured to control selection, trapping, and movement of micro-objects and/or droplets of medium in the microfluidic circuit 120. As discussed in detail herein, the enclosure 102 can comprise an electrowetting (EW) configuration, such as an opto-electrowetting (OEW) configuration, an electrowetting on dielectric (EWOD) configuration, a single-sided electrowetting configuration, or the like. In certain embodiments, the enclosure 102 can further comprise a dielectrophoresis (DEP) configuration, such as an optoelectronic tweezer (OET) configuration, an electrically actuated DEP configuration, and the like. The motive module 162 can control the activation of electrodes and/or transistors (e.g., phototransistors) comprised by such EW and/or DEP configurations to select and move micro-objects and/or droplets of medium in the flow region 106/channel 122 and/or sequestration pens 124, 126, 128, 130.

The imaging module 164 can control the imaging device 194 (not shown). For example, the imaging module 164 can receive and process image data from the imaging device 194. Image data from the imaging device 194 can comprise any type of information captured by the imaging device 194 (e.g., the presence or absence of micro-objects, droplets of medium, accumulation of label, such as fluorescent label, etc.). Using the information captured by the imaging device 194, the imaging module 164 can further calculate the position of objects (e.g., micro-objects, droplets of medium, or the like) and/or the rate of motion of such objects within the microfluidic device 100.

The tilting module 166 can control the tilting motions of tilting device 190 (not shown). In addition, the tilting module 166 can control the tilting rate and timing, for example, to optimize transfer of micro-objects to the one or more sequestration pens via gravitational forces. The tilting module 166 is communicatively coupled with the imaging module 164 to receive data describing the motion of micro-objects and/or droplets of medium in the microfluidic circuit 120. Using this data, the tilting module 166 may adjust the tilt of the microfluidic circuit 120 in order to adjust the rate at which micro-objects and/or droplets of medium move in the microfluidic circuit 120. The tilting module 166 may also use this data to iteratively adjust the position of a micro-object and/or droplet of medium in the microfluidic circuit 120.

In the example shown in FIG. 1A, the microfluidic circuit 120 is illustrated as comprising a single flow region 106 consisting essentially of microfluidic channel 122. Each of sequestration pens 124, 126, 128, and 130 comprises a single opening to flow region 106/channel 122, but otherwise is enclosed such that the pens can substantially isolate micro-objects inside the pen from micro-objects and/or fluidic medium 180 in the flow region 106/channel 122 or in other pens. The walls of the sequestration pen can extend from the inner surface 109 of the base to the inside surface of the cover 110 to thereby facilitate such isolation. The opening of the pen to the flow region 106/channel 122 can be oriented at an angle with respect to the flow of fluidic medium 180 in flow region 106/channel 122 such that the flow of fluidic medium 180 is not directed into the pens. The flow may be, for example, tangential or orthogonal to the plane of the opening of the pen. In some instances, pens 124, 126, 128, and/or 130 are configured to physically corral one or more micro-objects within the microfluidic circuit 120. Sequestration pens in accordance with the present invention can comprise various shapes, surfaces and features that are optimized for use with EW, OEW, DEP, and/or OET forces, fluid flow, and/or gravitational forces, as will be discussed in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful for the manipulation of micro-objects and/or droplets of fluidic medium with the microfluidic device 100. Thus, in some embodiments, the microfluidic circuit 120 may comprise a plurality of microfluidic sequestration pens, wherein two or more of the sequestration pens comprise differing structures and/or features which provide differing benefits. In some embodiments, however, the microfluidic circuit 120 comprises a plurality of identical microfluidic sequestration pens. Microfluidic devices useful the manipulation of micro-objects and/or droplets of medium may include any of the sequestration pens 124, 126, 128, and 130, or variations thereof, including pens configured like those shown in FIGS. 2B and 2C, as discussed below.

In the embodiment illustrated in FIG. 1A, a single flow region 106 is shown. However, other embodiments of microfluidic device 100 may contain multiple flow regions 106, each configured to provide a separate path for fluid to flow through the microfluidic device 100. The microfluidic circuit 120 comprises an inlet valve or port 107 in fluid communication with the flow region 106, whereby fluidic medium 180 can access flow region 106/channel 122 via the inlet port 107. In some instances, the flow region 106 comprises a single flow path. In other instances, the flow region 106 comprises a plurality of flow paths (e.g., 2, 3, 4, 5, 6, or more), each of which may comprise a microchannel (e.g., like channel 122). Two or more (e.g., all) of the plurality of flow paths may be substantially parallel to one another. For example, flow region 106 can split into a plurality of parallel channels (e.g., like channel 122). In certain embodiments, the flow region 106 (and one or more channels comprised by the flow region) is arranged in a zigzag pattern, whereby the flow region 106 travels across the microfluidic device 100 two or more times in alternating directions. In some instances, the fluidic medium within each flow region 106 flows in at least one of a forward or reverse direction. In some instances, a plurality of sequestration pens is configured (e.g., relative to a flow region 106/channel 122) such that the sequestration pens can be loaded with target micro-objects in parallel.

In some embodiments, microfluidic circuit 120 further comprises one or more micro-object traps 132. The traps 132 are generally formed in a wall forming the boundary of a flow region 106/channel 122, and may be positioned opposite an opening of one or more of the microfluidic sequestration pens 124, 126, 128, and 130. In some embodiments, the traps 132 are configured to receive or capture a single micro-object from the flow region 106/channel 122. In some embodiments, the traps 132 are configured to receive or capture a plurality of micro-objects from the flow region 106/channel 122. In some instances, the traps 132 comprise a volume approximately equal to the volume of a single target micro-object.

The traps 132 may further comprise an opening which is configured to assist the flow of targeted micro-objects into the traps 132. In some instances, the traps 132 comprise an opening having a height and width that is size according to the dimensions of a single target micro-object, whereby other micro-objects (or micro-objects that are greater in size) are prevented from entering into the micro-object trap. The traps 132 may further comprise other features configured to assist in retention of targeted micro-objects within the trap 132. In some instances, the trap 132 is aligned with and situated on the opposite side of a channel 122 relative to the opening of a microfluidic sequestration pen, such that upon tilting the microfluidic device 100 about an axis parallel to the channel 122, the trapped micro-object exits the trap 132 at a trajectory that causes the micro-object to fall into the opening of the sequestration pen. In some instances, the trap 132 comprises a side passage 134 that is smaller than the target micro-object in order to facilitate flow through the trap 132 and thereby increase the likelihood of capturing a micro-object in the trap 132.

As discussed in greater detail below, in some embodiments electrowetting (EW) forces are applied at one or more positions on the surface of the support structure 104 (and/or the cover 110) of the microfluidic device 100 (e.g., positions within the flow region and/or the sequestration pens) via one or more electrodes (not shown) to manipulate, transport, separate and sort droplets located in the microfluidic circuit 120. For example, in some embodiments, EW forces are applied at one or more positions on the surface of the support structure 104 (and/or the cover 110) to transfer a droplet from the flow region 106 into a desired microfluidic sequestration pen. In some embodiments, EW forces are used to prevent a droplet within a sequestration pen (e.g., sequestration pen 124, 126, 128, or 130) from being displaced therefrom. Further, in some embodiments, EW forces are used to selectively remove a droplet from a sequestration pen that was previously collected in accordance with the teachings of the instant invention. In some embodiments, the EW forces comprise opto-electrowetting (OEW) forces.

In some embodiments, dielectrophoretic (DEP) forces are applied across the fluidic medium 180 (e.g., in the flow region and/or in the sequestration pens) via one or more electrodes (not shown) to manipulate, transport, separate and sort micro-objects located therein. For example, in some embodiments, DEP forces are applied within one or more portions of microfluidic circuit 120 to transfer a single micro-object from the flow region 106 into a desired microfluidic sequestration pen. In some embodiments, DEP forces are used to prevent a micro-object within a sequestration pen (e.g., sequestration pen 124, 126, 128, or 130) from being displaced therefrom. Further, in some embodiments, DEP forces are used to selectively remove a micro-object from a sequestration pen that was previously collected in accordance with the teachings of the instant invention. In some embodiments, the DEP forces comprise optoelectronic tweezer (OET) forces.

In some embodiments, DEP and/or EW forces are combined with other forces, such as flow and/or gravitational force, so as to manipulate, transport, separate and sort micro-objects and/or droplets within the microfluidic circuit 120. For example, the enclosure 102 can be tilted (e.g., by tilting device 190) to position the flow region 106/channel 122 and micro-objects located therein above the microfluidic sequestration pens, and the force of gravity can transport the micro-objects and/or droplets into the pens. In some embodiments, the DEP and/or EW forces can be applied prior to the other forces. In other embodiments, the DEP and/or EW forces can be applied after the other forces. In still other instances, the DEP and/or EW forces can be applied at the same time as the other forces or in an alternating manner with the other forces.

Figure 2A:
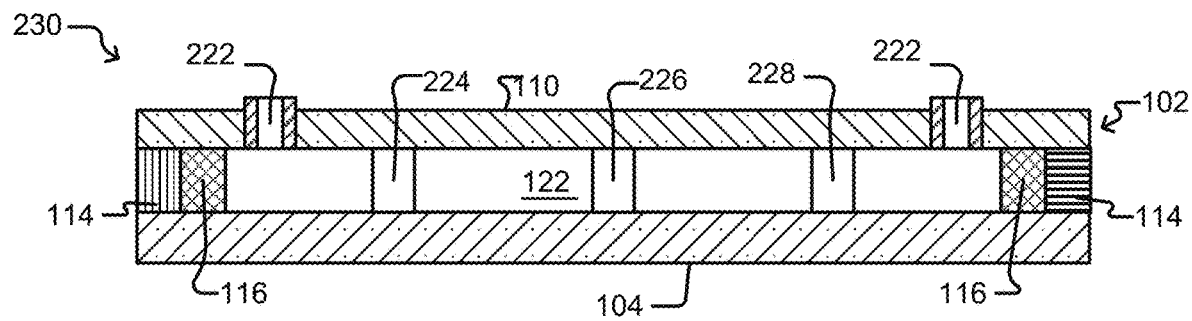
FIGS. 2A and 2B illustrate isolation pens according to some embodiments of the invention.

Microfluidic device motive configurations. As described above, the control and monitoring equipment of the system can comprise a motive module for selecting and moving objects, such as micro-objects or droplets, in the microfluidic circuit of a microfluidic device. The microfluidic devices of the invention can have a variety of motive configurations, depending upon the type of object being moved and other considerations. In particular, the support structure 104 and/or cover 110 of the microfluidic device 100 can comprise an electrowetting (EW) configuration for selectively inducing EW forces on droplets in a fluidic medium 180 in the microfluidic circuit 120 and thereby select, capture, and/or move individual droplets or groups of droplets. In certain embodiments, the microfluidic devices of the invention can comprise a first section having an EW configuration and a second section having a dielectrophoresis (DEP) configuration. Thus, at least a section of the support structure 104 and/or cover 110 of the microfluidic device 100 can comprise a DEP configuration for selectively inducing DEP forces on micro-objects in a fluidic medium 180 in the microfluidic circuit 120 and thereby select, capture, and/or move individual micro-objects or groups of micro-objects Electrowetting configurations. In certain embodiments, a microfluidic device of the invention can comprise an electrowetting configuration which includes a substrate having a dielectric layer and a droplet actuation surface. The droplet actuation surface can comprise a hydrophobic layer, which may be covalently bonded to the dielectric layer, although that is not required for the present methods. The dielectric layer can located beneath the hydrophobic layer such that a droplet resting on the substrate directly contacts the hydrophobic layer. FIG. 2A illustrates an example of a portion of such a microfluidic device.

As shown, apparatus 400 can include a base 104 which comprises the substrate and at least one electrode (e.g., a first electrode) 418. The substrate can comprise various layers, including an outer hydrophobic layer 412, an inner dielectric layer 414, a conductive layer 416, an electrode 418, and optionally a support 420. The hydrophobic layer 412 and the inner dielectric layer 414 can provide an inward-facing surface of the substrate 102 that defines, in part, the enclosure.

Apparatus 400 also includes a cover 110, which includes an outer hydrophobic layer 422, an inner layer 428, which may comprise the at least one electrode, and optionally a support 430. Cover 110 and base 104 are substantially parallel to one another and joined together by a spacing element 108 (e.g., microfluidic circuit material) so as to define an enclosure 435 configured to hold a liquid medium. The liquid medium can be, for example, a hydrophobic liquid, such as an oil. In addition, the enclosure 435 can hold a droplet of liquid 440, such as an aqueous medium. Typically, the liquid medium and the liquid of the droplet are selected to be immiscible liquids.

The spacing element 108 can comprise a polymer. The polymer can be, for example, a silicon-based organic polymer, such as polydimethylsiloxane (PDMS) or photo-patternable silicone (PPS), both available from Dow Corning. Alternatively, the spacing element 108 can comprise an epoxy-based adhesive. The epoxy-based adhesive can be, for example, SU-8 or equivalent types of materials. The spacing element 108 can have a thickness (i.e., the gap between the inner surface of the substrate 104 and the cover 110) of at least 30, 40, 50, 60, 70, 80, 90, 100, or more microns. Thus, for example, the thickness of spacing element 108 can be 30-60 microns, 40-80 microns, 50-100 microns, 60-120 microns, 70-140 microns, 75-150 microns, 80-160 microns, 90-180 microns, or 100-200 microns.

The spacing element 108 can define one or more microfluidic channels within the enclosure. In addition, the spacing element 108 can further define a plurality of chambers (or sequestration pens) within the enclosure, wherein each chamber is fluidically connected to and opens off of at least one microfluidic channel. Thus, for example, the spacing element 108 can define a single microfluidic channel and a plurality of chambers fluidically connected thereto, or a plurality of microfluidic channels with each channel fluidically connected to a plurality of chambers. Furthermore, each chamber can be fluidically connected to more than one microfluidic channel, as illustrated in FIGS. 6 and 7.

When the at least one electrode 418 of the substrate 104 and the at least one electrode 428 of the cover 110 are connected to opposing terminals of an AC voltage source (not shown), the substrate 104 is capable of applying an electrowetting force to aqueous droplets in contact with the outer hydrophobic surface 412 (i.e., the droplet actuation surface) of the substrate 104. In certain embodiments, the AC voltage used to achieve electrowetting-based movement of a droplet in the microfluidic device is at least 20 Volts peak-to-peak (ppV) (e.g., about 20 to 80 ppV, about 20 to 60 ppV, about 25 to 50 ppV, about 25 to 40 ppV, or about 25 to 35 ppV). In certain embodiments, the frequency of the AC voltage used to achieve electrowetting-based movement of a droplet in the microfluidic device is about 1 to 100 kHz (e.g., about 5 to 90 kHz, about 10 to 80 kHz, about 15 to 70 kHz, about 20 to 60 kHz, about 25 to 50 kHz, or about 30 to 40 kHz).

The outer hydrophobic layer 412 of the substrate 104 and the outer hydrophobic layer 422 of the cover 110 can each comprise a fluorine-containing compound, such as Cytop or Teflon. Alternatively, the outer hydrophobic layer 412 of the substrate 104 and the outer hydrophobic layer 422 of the cover 110 can each comprise a densely packed monolayer of self-associating molecules covalently bound to the inner dielectric layer 414 of the substrate 104 or the inner layer 428 of the cover 110, respectively. The self-associating molecules of the monolayer comprise sufficient two-dimensional packing density so as to create a hydrophobic barrier between a surface to which the monolayer is bound and a hydrophilic liquid (i.e., to prevent intercalation and/or penetration of polar molecules or other chemical species into the monolayer). The packing density of a densely packed monolayer will depend on the self-associating molecules used. A densely packed monolayer comprising alkyl-terminated siloxane will typically comprise at least $1 \times 10^{14}$ molecules/cm$^2$ (e.g., at least $1.5 \times 10^{14}$, $2.0 \times 10^{14}$, $2.5 \times 10^{14}$, or more molecules/cm$^2$).

As described in greater detail below, the self-associating molecules can each comprise a linking group, such as a siloxane group or a phosphonic acid group. The siloxane groups can be covalently bonded to the molecules of the inner dielectric layer 414 or inner layer 428. Similarly, the phosphonic acid groups can be covalently bonded to the molecules of the inner dielectric layer 414 or inner layer 428. The self-associating molecules can comprise long-chain hydrocarbons, which can be unbranched. Thus, the self-associating molecules can comprise alkyl-terminated siloxane or alkyl-terminated phosphonic acid. The long-chain hydrocarbons can comprise a chain of at least 10 carbons (e.g., at least 16, 18, 20, 22, or more carbons). The self-associating molecules can comprise fluorinated carbon chains. Thus, for example, the self-associating molecules can comprise fluoroalkyl-terminated siloxane or fluoroalkyl-terminated phosphonic acid. The fluorinated carbon chains can have the chemical formula $CF_3-(CF_2)_m-(CH_2)_n-$, wherein m is at least 2, n is 0, 1, 2, or greater, and m+n is at least 9.

The monolayer of self-associating molecules can have a thickness of less than about 5 nanometers (e.g., about 1.0 to about 4.0 nanometers, about 1.5 to about 3.0 nanometers, or about 2.0 to about 2.5 nanometers).

The outer hydrophobic layer 412 of the substrate 104 can be patterned such that select regions are relatively hydrophilic compared to the remainder of the outer hydrophobic layer. This can be achieved, for example, by increasing the voltage drop across the underlying inner dielectric layer 122 to 50 ppV or greater (e.g., 60, 65, 70, 75, 80, or more ppV) for a period of time. Without intending to be bound by theory, it is believed that the relatively hydrophilic regions comprise water molecules that have intercalated into the monolayer.

In some embodiments, the inner dielectric layer of the substrate can comprise one or more oxide layers. For example, the inner dielectric layer can comprise or consist of a single oxide layer, such as a metal oxide layer. Alternatively, the inner dielectric layer can comprise or consist of two layers. In some embodiments, the first layer can be silicon dioxide or silicon nitride, and the other layer can be a metal oxide, such as aluminum oxide. In certain embodiment, the thickness of the metal oxide layer can range from about 15 nm to about 45 nm, or about 30 nm to about 40 nm, or about 33 nm to about 36 nm. The metal oxide layer can be deposited by an Atomic Layer Deposition (ALD) technique and the layer comprising silicon dioxide or silicon nitride can be deposited by a Plasma Enhanced Chemical Vapor Deposition (PECVD) technique.

In yet another embodiment, the inner dielectric layer can comprise three layers of dielectric material. In some embodiments, a first layer can comprise a metal oxide, such as aluminum oxide, hafnium oxide, or the like, which can be sandwiched between a silicon dioxide layer and a silicon nitride layer. In certain embodiment, the thickness of the metal oxide layer can range from about 5 nm to about 20 nm, and the layer can be deposited by an Atomic Layer Deposition (ALD) technique. The silicon oxide layer can also be deposited by ALD, and can have a thickness of about 2 nm to about 10 nm. The silicon nitride layer can be deposited by a Plasma Enhanced Chemical Vapor Deposition (PECVD) technique has and can have a thickness of about 80 nm to about 100 nm, or about 90 nm thickness.

Regardless of the number of layers that make up the inner dielectric layer, the inner dielectric layer can have a thickness of about 50 to 105 nanometers and/or an impedance of about 50 to 150 kOhms, with a preferred embodiment of about 100 kOhms.

The substrate 104 can comprise a photoresponsive layer 146 having a first side that contacts the inner dielectric layer 414. The second side of the photoresponsive layer 416 can contact the at least one electrode 418. The photoresponsive layer 416 can comprise hydrogenated amorphous silicon (a-Si:H). For example, the a-Si:H can comprise about 8% to 40% hydrogen (i.e., calculated as 100*the number of hydrogen atoms/total number of hydrogen and silicon atoms). The a-Si:H layer can have a thickness of at least about 500 nanometers (e.g., at least about 600 to 1400, about 700 to 1300, about 800 to 1200, about 900 to 1100, or about 1000 nanometers). However, the thickness of the a-Si:H layer can be varied in accordance with the thickness of the inner dielectric layer 414 so as to achieve a suitable difference between the impedance of the inner dielectric layer 414 and the impedance of the a-Si:H layer when the substrate 104 is in the on state (i.e., illuminated and conducting) and the off state (i.e., dark and non-conducting). For example, the impedance of the inner dielectric layer 414 can be tuned to about 50 kOhms to about 150 kOhms, and the impedance of the a-Si:H layer can be tuned to at least about 0.5 MOhms in the off state and less than or equal to about 1 kOhms in the on state. These are only examples, but they illustrate how the impedances can be tuned to achieve a photoresponsive (in this case, photoconductive) layer 416 displaying robust on/off performance. In embodiments where the substrate 104 has a photoresponsive layer 416 formed from a-Si:H layer, the substrate 104 can optionally include floating electrode pads located between the photoresponsive layer 416 and the inner dielectric layer 414. Such floating electrode pads have been described, for example, in U.S. Pat. No. 6,958,132, the contents of which are incorporated herein by reference.

The photoresponsive layer 416 can, alternatively, comprise a plurality of conductors, each conductor controllably connectable to the at least one electrode of the substrate 102 via a phototransistor switch. Conductors controlled by phototransistor switches are well-known in the art and have been described, e.g., in U.S. Patent Application No. 2014/0124370, the contents of which are incorporated herein by reference.

The substrate 104 can comprise a single electrode 418 configured to be connected to an AC voltage source. The single electrode 418 can comprising a layer of indium-tin-oxide (ITO), which can, for example, be formed upon by a glass support 420. Alternatively, the single electrode 418 can comprise a layer of electrically conductive silicon. In other embodiments, the substrate 104 can comprise a plurality of electrodes that are individually addressable, as in the manner of EWOD devices, which are well-known in the art. The individually addressable electrodes can be connectable to one or more AC voltage sources via corresponding transistor switches.

The cover 110 can, in the manner of the substrate, further comprise a dielectric layer (not shown) juxtaposed to the hydrophobic layer 422, and a conductive layer (not shown) juxtaposed between the dielectric layer and the electrode 428. Thus, the microfluidic apparatus 400 can have both the substrate 104 and the cover 110 configured to provide an electrowetting force to an aqueous droplet 440 located within the enclosure 435. In such embodiments, the dielectric layer of the cover 110 can be configured in any of the ways disclosed herein for the inner dielectric layer 414 of the substrate 104, and the conductive layer of the cover 104 can be configured in any of the ways disclosed herein for the conductive layer 126 of the substrate 102.

Figure 1C:
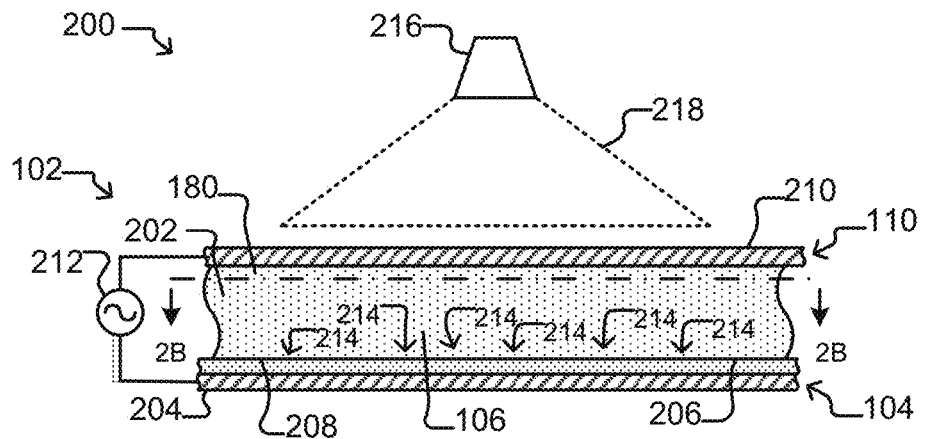
FIGS. 1C and 1D illustrate a microfluidic device according to some embodiments of the invention.
Figure 1D:
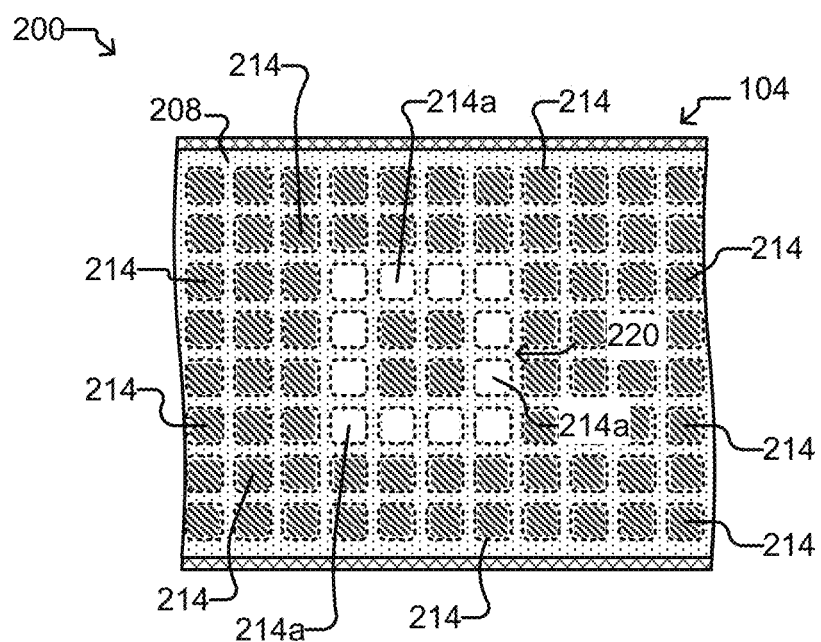

Dielectrophoresis (DEP) configurations. As discussed herein, the microfluidic devices of the invention can include a section having a DEP configuration. One example of such as section is microfluidic device 200 illustrated in FIGS. 1C and 1D While for purposes of simplicity FIGS. 1C and 1D show a vertical cross-sectional view and a horizontal cross-sectional view, respectively, of a portion of an enclosure 102 of the microfluidic device 200 having an open region/chamber 202, it should be understood that the region/chamber 202 may be part of a fluidic circuit element having a more detailed structure, such as a growth chamber, a sequestration pen, a flow region, or a flow channel. Furthermore, the microfluidic device 200 may include other fluidic circuit elements. For example, the microfluidic device 200 can include a plurality of growth chambers or sequestration pens and/or one or more flow regions or flow channels, such as those described herein with respect to microfluidic device 100. A DEP configuration may be incorporated into any such fluidic circuit elements of the microfluidic device 200, or select portions thereof. It should be further appreciated that any of the above or below described microfluidic device components and system components may be incorporated in and/or used in combination with the microfluidic device 200. For example, system 150 including control and monitoring equipment 152, described above, may be used with microfluidic device 200, including one or more of the media module 160, motive module 162, imaging module 164, tilting module 166, and other modules 168.

As seen in FIG. 1C, the microfluidic device 200 includes a support structure 104 having a bottom electrode 204 and an electrode activation substrate 206 overlying the bottom electrode 204, and a cover 110 having a top electrode 210, with the top electrode 210 spaced apart from the bottom electrode 204. The top electrode 210 and the electrode activation substrate 206 define opposing surfaces of the region/chamber 202. A medium 180 contained in the region/chamber 202 thus provides a resistive connection between the top electrode 210 and the electrode activation substrate 206. A power source 212 configured to be connected to the bottom electrode 204 and the top electrode 210 and create a biasing voltage between the electrodes, as required for the generation of DEP forces in the region/chamber 202, is also shown. The power source 212 can be, for example, an alternating current (AC) power source.

In certain embodiments, the microfluidic device 200 illustrated in FIGS. 1C and 1D can have an optically-actuated DEP configuration. Accordingly, changing patterns of light 218 from the light source 216, which may be controlled by the motive module 162, can selectively activate and deactivate changing patterns of DEP electrodes at regions 214 of the inner surface 208 of the electrode activation substrate 206. (Hereinafter the regions 214 of a microfluidic device having a DEP configuration are referred to as "DEP electrode regions.") As illustrated in FIG. 1D, a light pattern 218 directed onto the inner surface 208 of the electrode activation substrate 206 can illuminate select DEP electrode regions 214a (shown in white) in a pattern, such as a square. The non-illuminated DEP electrode regions 214 (cross-hatched) are hereinafter referred to as "dark" DEP electrode regions 214. The relative electrical impedance through the DEP electrode activation substrate 206 (i.e., from the bottom electrode 204 up to the inner surface 208 of the electrode activation substrate 206 which interfaces with the medium 180 in the flow region 106) is greater than the relative electrical impedance through the medium 180 in the region/chamber 202 (i.e., from the inner surface 208 of the electrode activation substrate 206 to the top electrode 210 of the cover 110) at each dark DEP electrode region 214. An illuminated DEP electrode region 214a, however, exhibits a reduced relative impedance through the electrode activation substrate 206 that is less than the relative impedance through the medium 180 in the region/chamber 202 at each illuminated DEP electrode region 214a.

With the power source 212 activated, the foregoing DEP configuration creates an electric field gradient in the fluidic medium 180 between illuminated DEP electrode regions 214a and adjacent dark DEP electrode regions 214, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 214 at the inner surface 208 of the region/chamber 202 by changing light patterns 218 projected from a light source 216 into the microfluidic device 200. Whether the DEP forces attract or repel nearby micro-objects can depend on such parameters as the frequency of the power source 212 and the dielectric properties of the medium 180 and/or micro-objects (not shown).

The square pattern 220 of illuminated DEP electrode regions 214a illustrated in FIG. 1C is an example only. Any pattern of the DEP electrode regions 214 can be illuminated (and thereby activated) by the pattern of light 218 projected into the device 200, and the pattern of illuminated/activated DEP electrode regions 214 can be repeatedly changed by changing or moving the light pattern 218.

In some embodiments, the electrode activation substrate 206 can comprise or consist of a photoconductive material. In such embodiments, the inner surface 208 of the electrode activation substrate 206 can be featureless. For example, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 µm. In such embodiments, the DEP electrode regions 214 can be created anywhere and in any pattern on the inner surface 208 of the electrode activation substrate 206, in accordance with the light pattern 218. The number and pattern of the DEP electrode regions 214 thus need not be fixed, but can correspond to the light pattern 218. Examples of microfluidic devices having a DEP configuration comprising a photoconductive layer such as discussed above have been described, for example, in U.S. Pat. No. RE 44,711 (Wu et al.) (originally issued as U.S. Pat. No. 7,612,355), the entire contents of which are incorporated herein by reference.

Figure 2B:
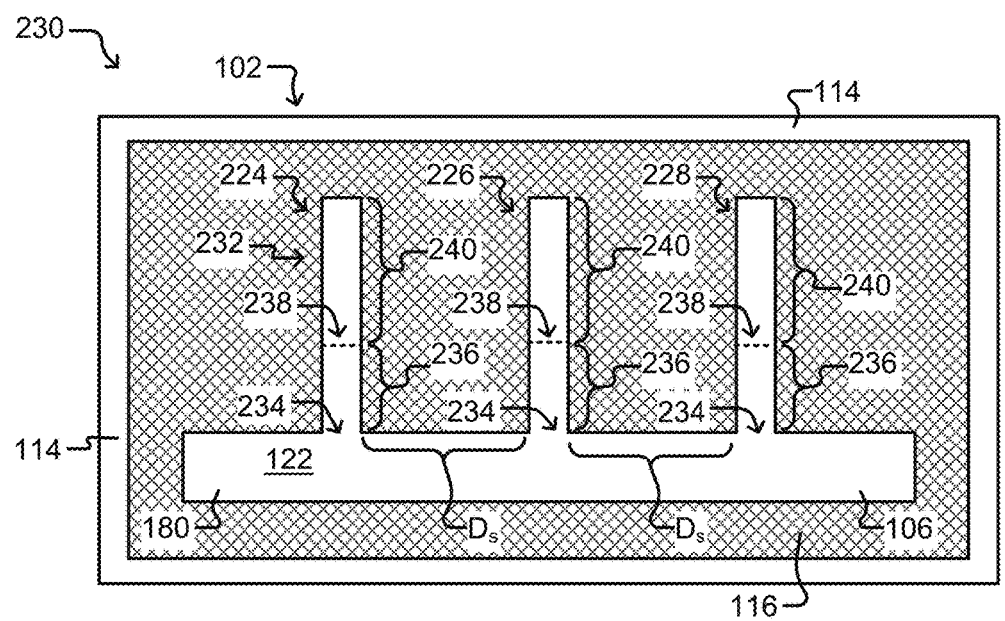

In other embodiments, the electrode activation substrate 206 can comprise a substrate comprising a plurality of doped layers, electrically insulating layers (or regions), and electrically conductive layers that form semiconductor integrated circuits, such as is known in semiconductor fields. For example, the electrode activation substrate 206 can comprise a plurality of phototransistors, including, for example, lateral bipolar phototransistors, each phototransistor corresponding to a DEP electrode region 214. Alternatively, the electrode activation substrate 206 can comprise electrodes (e.g., conductive metal electrodes) controlled by phototransistor switches, with each such electrode corresponding to a DEP electrode region 214. The electrode activation substrate 206 can include a pattern of such phototransistors or phototransistor-controlled electrodes. The pattern, for example, can be an array of substantially square phototransistors or phototransistor-controlled electrodes arranged in rows and columns, such as shown in FIG. 2B. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 214 at the inner surface 208 of the electrode activation substrate 206 and the bottom electrode 204, and those electrical connections (i.e., phototransistors or electrodes) can be selectively activated and deactivated by the light pattern 218. When not activated, each electrical connection can have high impedance such that the relative impedance through the electrode activation substrate 206 (i.e., from the bottom electrode 204 to the inner surface 208 of the electrode activation substrate 206 which interfaces with the medium 180 in the region/chamber 202) is greater than the relative impedance through the medium 180 (i.e., from the inner surface 208 of the electrode activation substrate 206 to the top electrode 210 of the cover 110) at the corresponding DEP electrode region 214. When activated by light in the light pattern 218, however, the relative impedance through the electrode activation substrate 206 is less than the relative impedance through the medium 180 at each illuminated DEP electrode region 214, thereby activating the DEP electrode at the corresponding DEP electrode region 214 as discussed above. DEP electrodes that attract or repel micro-objects (not shown) in the medium 180 can thus be selectively activated and deactivated at many different DEP electrode regions 214 at the inner surface 208 of the electrode activation substrate 206 in the region/chamber 202 in a manner determined by the light pattern 218.

Examples of microfluidic devices having electrode activation substrates that comprise phototransistors have been described, for example, in U.S. Pat. No. 7,956,339 (Ohta et al.) (see, e.g., device 300 illustrated in FIGS. 21 and 22, and descriptions thereof), the entire contents of which are incorporated herein by reference. Examples of microfluidic devices having electrode activation substrates that comprise electrodes controlled by phototransistor switches have been described, for example, in U.S. Patent Publication No. 2014/0124370 (Short et al.) (see, e.g., devices 200, 400, 500, 600, and 900 illustrated throughout the drawings, and descriptions thereof), the entire contents of which are incorporated herein by reference.

In some embodiments of a DEP configured microfluidic device, the top electrode 210 is part of a first wall (or cover 110) of the enclosure 102, and the electrode activation substrate 206 and bottom electrode 204 are part of a second wall (or support structure 104) of the enclosure 102. The region/chamber 202 can be between the first wall and the second wall. In other embodiments, the electrode 210 is part of the second wall (or support structure 104) and one or both of the electrode activation substrate 206 and/or the electrode 210 are part of the first wall (or cover 110). Moreover, the light source 216 can alternatively be used to illuminate the enclosure 102 from below.

With the microfluidic device 200 of FIGS. 1C-1D having a DEP configuration, the motive module 162 can select a micro-object (not shown) in the medium 180 in the region/chamber 202 by projecting a light pattern 218 into the device 200 to activate a first set of one or more DEP electrodes at DEP electrode regions 214a of the inner surface 208 of the electrode activation substrate 206 in a pattern (e.g., square pattern 220) that surrounds and captures the micro-object. The motive module 162 can then move the captured micro-object by moving the light pattern 218 relative to the device 200 to activate a second set of one or more DEP electrodes at DEP electrode regions 214. Alternatively, the device 200 can be moved relative to the light pattern 218.

In other embodiments, the microfluidic device 200 can have a DEP configuration that does not rely upon light activation of DEP electrodes at the inner surface 208 of the electrode activation substrate 206. For example, the electrode activation substrate 206 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 214, thereby creating a net DEP force on a micro-object (not shown) in region/chamber 202 in the vicinity of the activated DEP electrodes. Depending on such characteristics as the frequency of the power source 212 and the dielectric properties of the medium (not shown) and/or micro-objects in the region/chamber 202, the DEP force can attract or repel a nearby micro-object. By selectively activating and deactivating a set of DEP electrodes (e.g., at a set of DEP electrodes regions 214 that forms a square pattern 220), one or more micro-objects in region/chamber 202 can be trapped and moved within the region/chamber 202. The motive module 162 in FIG. 1A can control such switches and thus activate and deactivate individual ones of the DEP electrodes to select, trap, and move particular micro-objects (not shown) around the region/chamber 202. Microfluidic devices having a DEP configuration that includes selectively addressable and energizable electrodes are known in the art and have been described, for example, in U.S. Pat. No. 6,294,063 (Becker et al.) and U.S. Pat. No. 6,942,776 (Medoro), the entire contents of which are incorporated herein by reference.

Sequestration pens. Non-limiting examples of generic sequestration pens 224, 226, and 228 are shown within the microfluidic device 230 depicted in FIGS. 2A-2C. Each sequestration pen 224, 226, and 228 can comprise an isolation structure 232 defining an isolation region 240 and a connection region 236 fluidically connecting the isolation region 240 to a channel 122. The connection region 236 can comprise a proximal opening 234 to the channel 122 and a distal opening 238 to the isolation region 240. The connection region 236 can be configured so that the maximum penetration depth of a flow of a fluidic medium (not shown) flowing from the channel 122 into the sequestration pen 224, 226, 228 does not extend into the isolation region 240. Thus, due to the connection region 236, a micro-object (not shown) or other material (not shown) disposed in an isolation region 240 of a sequestration pen 224, 226, 228 can thus be isolated from, and not substantially affected by, a flow of medium 180 in the channel 122.

Figure 2C:
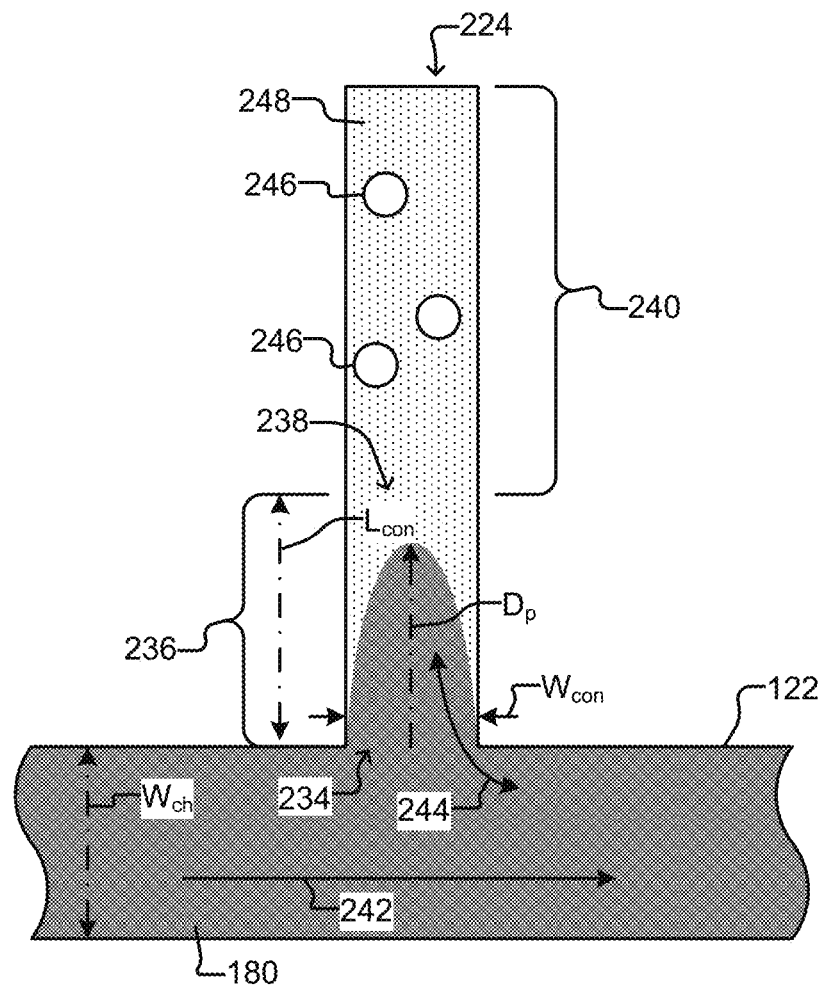
FIG. 2C illustrates a detailed sequestration pen according to some embodiments of the invention.

The sequestration pens 224, 226, and 228 of FIGS. 2A-2C each have a single opening which opens directly to the channel 122. The opening of the sequestration pen opens laterally from the channel 122. The electrode activation substrate 206 underlays both the channel 122 and the sequestration pens 224, 226, and 228. The upper surface of the electrode activation substrate 206 within the enclosure of a sequestration pen, forming the floor of the sequestration pen, is disposed at the same level or substantially the same level of the upper surface the of electrode activation substrate 206 within the channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 microns, 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the channel 122 (or flow region) and sequestration pens may be less than about 3%, 2%, 1%. 0.9%, 0.8%, 0.5%, 0.3% or 0.1% of the height of the walls of the sequestration pen or walls of the microfluidic device. While described in detail for the microfluidic device 200, this also applies to any of the microfluidic devices 100, 230, 250, 280, 290, 600, 700 described herein.

The channel 122 can thus be an example of a swept region, and the isolation regions 240 of the sequestration pens 224, 226, 228 can be examples of unswept regions. As noted, the channel 122 and sequestration pens 224, 226, 228 can be configured to contain one or more fluidic media 180. In the example shown in FIGS. 2A-2B, the ports 222 are connected to the channel 122 and allow a fluidic medium 180 to be introduced into or removed from the microfluidic device 230. Prior to introduction of the fluidic medium 180, the microfluidic device may be primed with a gas such as carbon dioxide gas. Once the microfluidic device 230 contains the fluidic medium 180, the flow 242 of fluidic medium 180 in the channel 122 can be selectively generated and stopped. For example, as shown, the ports 222 can be disposed at different locations (e.g., opposite ends) of the channel 122, and a flow 242 of medium can be created from one port 222 functioning as an inlet to another port 222 functioning as an outlet.

FIG. 2C illustrates a detailed view of an example of a sequestration pen 224 according to the present invention. Examples of micro-objects 246 are also shown.

As is known, a flow 242 of fluidic medium 180 in a microfluidic channel 122 past a proximal opening 234 of sequestration pen 224 can cause a secondary flow 244 of the medium 180 into and/or out of the sequestration pen 224. To isolate micro-objects 246 in the isolation region 240 of a sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ of the secondary flow 244 depends upon the velocity of the fluidic medium 180 flowing in the channel 122 and various parameters relating to the configuration of the channel 122 and the proximal opening 234 of the connection region 236 to the channel 122. For a given microfluidic device, the configurations of the channel 122 and the opening 234 will be fixed, whereas the rate of flow 242 of fluidic medium 180 in the channel 122 will be variable. Accordingly, for each sequestration pen 224, a maximal velocity $V_{max}$ for the flow 242 of fluidic medium 180 in channel 122 can be identified that ensures that the penetration depth $D_p$ of the secondary flow 244 does not exceed the length $L_{con}$ of the connection region 236. As long as the rate of the flow 242 of fluidic medium 180 in the channel 122 does not exceed the maximum velocity $V_{max}$, the resulting secondary flow 244 can be limited to the channel 122 and the connection region 236 and kept out of the isolation region 240. The flow 242 of medium 180 in the channel 122 will thus not draw micro-objects 246 out of the isolation region 240. Rather, micro-objects 246 located in the isolation region 240 will stay in the isolation region 240 regardless of the flow 242 of fluidic medium 180 in the channel 122.

Moreover, as long as the rate of flow 242 of medium 180 in the channel 122 does not exceed $V_{max}$, the flow 242 of fluidic medium 180 in the channel 122 will not move miscellaneous particles (e.g., microparticles and/or nanoparticles) from the channel 122 into the isolation region 240 of a sequestration pen 224. Having the length $L_{con}$ of the connection region 236 be greater than the maximum penetration depth $D_p$ of the secondary flow 244 can thus prevent contamination of one sequestration pen 224 with miscellaneous particles from the channel 122 or another sequestration pen (e.g., sequestration pens 226, 228 in FIG. 2D).

Because the channel 122 and the connection regions 236 of the sequestration pens 224, 226, 228 can be affected by the flow 242 of medium 180 in the channel 122, the channel 122 and connection regions 236 can be deemed swept (or flow) regions of the microfluidic device 230. The isolation regions 240 of the sequestration pens 224, 226, 228, on the other hand, can be deemed unswept (or non-flow) regions. For example, components (not shown) in a first fluidic medium 180 in the channel 122 can mix with a second fluidic medium 248 in the isolation region 240 substantially only by diffusion of components of the first medium 180 from the channel 122 through the connection region 236 and into the second fluidic medium 248 in the isolation region 240. Similarly, components (not shown) of the second medium 248 in the isolation region 240 can mix with the first medium 180 in the channel 122 substantially only by diffusion of components of the second medium 248 from the isolation region 240 through the connection region 236 and into the first medium 180 in the channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange. The first medium 180 can be the same medium or a different medium than the second medium 248. Moreover, the first medium 180 and the second medium 248 can start out being the same, then become different (e.g., through conditioning of the second medium 248 by one or more cells in the isolation region 240, or by changing the medium 180 flowing through the channel 122).

The maximum penetration depth $D_p$ of the secondary flow 244 caused by the flow 242 of fluidic medium 180 in the channel 122 can depend on a number of parameters, as mentioned above. Examples of such parameters include: the shape of the channel 122 (e.g., the channel can direct medium into the connection region 236, divert medium away from the connection region 236, or direct medium in a direction substantially perpendicular to the proximal opening 234 of the connection region 236 to the channel 122); a width $W_{ch}$ (or cross-sectional area) of the channel 122 at the proximal opening 234; and a width $W_{con}$ (or cross-sectional area) of the connection region 236 at the proximal opening 234; the velocity V of the flow 242 of fluidic medium 180 in the channel 122; the viscosity of the first medium 180 and/or the second medium 248, or the like.

In some embodiments, the dimensions of the channel 122 and sequestration pens 224, 226, 228 can be oriented as follows with respect to the vector of the flow 242 of fluidic medium 180 in the channel 122: the channel width $W_{ch}$ (or cross-sectional area of the channel 122) can be substantially perpendicular to the flow 242 of medium 180; the width $W_{con}$ (or cross-sectional area) of the connection region 236 at opening 234 can be substantially parallel to the flow 242 of medium 180 in the channel 122; and/or the length $L_{con}$ of the connection region can be substantially perpendicular to the flow 242 of medium 180 in the channel 122. The foregoing are examples only, and the relative position of the channel 122 and sequestration pens 224, 226, 228 can be in other orientations with respect to each other.

As illustrated in FIG. 2C, the width $W_{con}$ of the connection region 236 can be uniform from the proximal opening 234 to the distal opening 238. The width $W_{con}$ of the connection region 236 at the distal opening 238 can thus be in any of the ranges identified herein for the width $W_{con}$ of the connection region 236 at the proximal opening 234. Alternatively, the width $W_{con}$ of the connection region 236 at the distal opening 238 can be larger than the width $W_{con}$ of the connection region 236 at the proximal opening 234.

As illustrated in FIG. 2C, the width of the isolation region 240 at the distal opening 238 can be substantially the same as the width $W_{con}$ of the connection region 236 at the proximal opening 234. The width of the isolation region 240 at the distal opening 238 can thus be in any of the ranges identified herein for the width $W_{con}$ of the connection region 236 at the proximal opening 234. Alternatively, the width of the isolation region 240 at the distal opening 238 can be larger or smaller than the width $W_{con}$ of the connection region 236 at the proximal opening 234. Moreover, the distal opening 238 may be smaller than the proximal opening 234 and the width $W_{con}$ of the connection region 236 may be narrowed between the proximal opening 234 and distal opening 238. For example, the connection region 236 may be narrowed between the proximal opening and the distal opening, using a variety of different geometries (e.g. chamfering the connection region, beveling the connection region). Further, any part or subpart of the connection region 236 may be narrowed (e.g. a portion of the connection region adjacent to the proximal opening 234).

In various embodiments of sequestration pens (e.g. 124, 126, 128, 130, 224, 226, or 228), the isolation region (e.g. 240 or 270) is configured to contain a plurality of micro-objects. In other embodiments, the isolation region can be configured to contain only one, two, three, four, five, or a similar relatively small number of micro-objects. Accordingly, the volume of an isolation region can be, for example, at least $1\times10^6$, $2\times10^6$, $4\times10^6$, $6\times10^6$ cubic microns, or more.

In various embodiments of sequestration pens, the width $W_{ch}$ of the channel (e.g., 122) at a proximal opening (e.g. 234) can be within any of the following ranges: about 50-1000 microns, 50-500 microns, 50-400 microns, 50-300 microns, 50-250 microns, 50-200 microns, 50-150 microns, 50-100 microns, 70-500 microns, 70-400 microns, 70-300 microns, 70-250 microns, 70-200 microns, 70-150 microns, 90-400 microns, 90-300 microns, 90-250 microns, 90-200 microns, 90-150 microns, 100-300 microns, 100-250 microns, 100-200 microns, 100-150 microns, and 100-120 microns. In some other embodiments, the width $W_{ch}$ of the channel (e.g., 122) at a proximal opening (e.g. 234) can be in a range of about 200-800 microns, 200-700 microns, or 200-600 microns. The foregoing are examples only, and the width $W_{ch}$ of the channel 122 can be in other ranges (e.g., a range defined by any of the endpoints listed above). Moreover, the $W_{ch}$ of the channel 122 can be selected to be in any of these ranges in regions of the channel other than at a proximal opening of a sequestration pen.

In some embodiments, a sequestration pen has a height of about 30 to about 200 microns, or about 50 to about 150 microns. In some embodiments, the sequestration pen has a cross-sectional area of about $1\times10^4$-$3\times10^6$ square microns, $2\times10^4$-$2\times10^6$ square microns, $4\times10^4$-$1\times10^6$ square microns, $2\times10^4$-$5\times10^5$ square microns, $2\times10^4$-$1\times10^5$ square microns or about $2\times10^5$-$2\times10^6$ square microns. In some embodiments, the connection region has a cross-sectional width of about 100 to about 500 microns, 200 to about 400 microns or about 200 to about 300 microns.

In various embodiments of sequestration pens, the height $H_{ch}$ of the channel (e.g., 122) at a proximal opening (e.g., 234) can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{ch}$ of the channel (e.g., 122) can be in other ranges (e.g., a range defined by any of the endpoints listed above). The height $H_{ch}$ of the channel 122 can be selected to be in any of these ranges in regions of the channel other than at a proximal opening of an sequestration pen.

In various embodiments of sequestration pens a cross-sectional area of the channel (e.g., 122) at a proximal opening (e.g., 234) can be within any of the following ranges: 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the channel (e.g., 122) at a proximal opening (e.g., 234) can be in other ranges (e.g., a range defined by any of the endpoints listed above).

In various embodiments of sequestration pens, the length $L_{con}$ of the connection region (e.g., 236) can be in any of the following ranges: about 1-600 microns, 5-550 microns, 10-500 microns, 15-400 microns, 20-300 microns, 20-500 microns, 40-400 microns, 60-300 microns, 80-200 microns, or about 100-150 microns. The foregoing are examples only, and length $L_{con}$ of a connection region (e.g., 236) can be in a different range than the foregoing examples (e.g., a range defined by any of the endpoints listed above).

In various embodiments of sequestration pens the width $W_{con}$ of a connection region (e.g., 236) at a proximal opening (e.g., 234) can be in any of the following ranges: 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-250 microns, 50-200 microns, 50-150 microns, 50-100 microns, 50-80 microns, 60-200 microns, 60-150 microns, 60-100 microns, 60-80 microns, 70-150 microns, 70-100 microns, and 80-100 microns. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, the width $W_{con}$ of a connection region (e.g., 236) at a proximal opening (e.g., 234) can be at least as large as the largest dimension of a micro-object (e.g., biological cell which may be a T cell, B cell, or an ovum or embryo) that the sequestration pen is intended for. For example, the width $W_{con}$ of a connection region 236 at a proximal opening 234 of an sequestration pen that a droplet will be placed into can be in any of the following ranges: about 100 microns, about 110 microns, about 120 microns, about 130 microns, about 140 microns, about 150 microns, about 160 microns, about 170 microns, about 180 microns, about 190 microns, about 200 microns, about 225 microns, about 250 microns, about 300 microns or about 100-400 microns, about 120-350 microns, about 140-300 microns, or about 140-200 microns. The foregoing are examples only, and the width $W_{con}$ of a connection region (e.g., 236) at a proximal opening (e.g., 234) can be different than the foregoing examples (e.g., a range defined by any of the endpoints listed above).

In various embodiments of sequestration pens, the width $W_{pr}$ of a proximal opening of a connection region may be at least as large as the largest dimension of a micro-object (e.g., a biological micro-object such as a cell) that the sequestration pen is intended for. For example, the width $W_{pr}$ may be about 50 microns, about 60 microns, about 100 microns, about 200 microns, about 300 microns or may be in a range of about 50-300 microns, about 50-200 microns, about 50-100 microns, about 75-150 microns, about 75-100 microns, or about 200-300 microns In various embodiments of sequestration pens, a ratio of the length $L_{con}$ of the connection region (e.g., 236) to a width $W_{con}$ of al the connection region (e.g., 236) at the proximal opening 234 can be greater than or equal to any of the following ratios: 0.5, 1.0, 1.5, 2.0, 2.5, 3.0, 3.5, 4.0, 4.5, 5.0, 6.0, 7.0, 8.0, 9.0, 10.0, or more. The foregoing are examples only, and the ratio of the length $L_{con}$ of a connection region 236 to a width $W_{con}$ of the connection region 236 at the proximal opening 234 can be different than the foregoing examples.

In various embodiments of microfluidic devices 100, 200, 230, 250, 280, 290, 320, 600, 700 $V_{max}$ can be set around 0.2, 0.3, 0.4, 0.5, 0.6, 0.7, 0.8, 0.9, 1.0, 1.1, 1.2, 1.3, 1.4, or 1.5 µL/sec.

In various embodiments of microfluidic devices having sequestration pens, the volume of an isolation region (e.g., 240) of a sequestration pen can be, for example, at least $5\times10^5$, $8\times10^5$, $1\times10^6$, $2\times10^6$, $4\times10^6$, $6\times10^6$, $8\times10^6$, $1\times10^7$, $5\times10^7$, $1\times10^8$, $5\times10^8$, or $8\times10^8$ cubic microns, or more. In various embodiments of microfluidic devices having sequestration pens, the volume of a sequestration pen may be about $5\times10^5$, $6\times10^5$, $8\times10^5$, $1\times10^6$, $2\times10^6$, $4\times10^6$, $8\times10^6$, $1\times10^7$, $3\times10^7$, $5\times10^7$, or about $8\times10^7$ cubic microns, or more. In some other embodiments, the volume of a sequestration pen may be about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters.

In various embodiment, the microfluidic device has sequestration pens configured as in any of the embodiments discussed herein where the microfluidic device has about 5 to about 10 sequestration pens, about 10 to about 50 sequestration pens, about 100 to about 500 sequestration pens; about 200 to about 1000 sequestration pens, about 500 to about 1500 sequestration pens, about 1000 to about 2000 sequestration pens, or about 1000 to about 3500 sequestration pens. The sequestration pens need not all be the same size and may include a variety of configurations (e.g., different widths, different features within the sequestration pen).

In some other embodiments, the microfluidic device has sequestration pens configured as in any of the embodiments discussed herein where the microfluidic device has about 1500 to about 3000 sequestration pens, about 2000 to about 3500 sequestration pens, about 2500 to about 4000 sequestration pens about 3000 to about 4500 sequestration pens, about 3500 to about 5000 sequestration pens, about 4000 to about 5500 sequestration pens, about 4500 to about 6000 sequestration pens, about 5000 to about 6500 sequestration pens, about 5500 to about 7000 sequestration pens, about 6000 to about 7500 sequestration pens, about 6500 to about 8000 sequestration pens, about 7000 to about 8500 sequestration pens, about 7500 to about 9000 sequestration pens, about 8000 to about 9500 sequestration pens, about 8500 to about 10,000 sequestration pens, about 9000 to about 10,500 sequestration pens, about 9500 to about 11,000 sequestration pens, about 10,000 to about 11,500 sequestration pens, about 10,500 to about 12,000 sequestration pens, about 11,000 to about 12,500 sequestration pens, about 11,500 to about 13,000 sequestration pens, about 12,000 to about 13,500 sequestration pens, about 12,500 to about 14,000 sequestration pens, about 13,000 to about 14,500 sequestration pens, about 13,500 to about 15,000 sequestration pens, about 14,000 to about 15,500 sequestration pens, about 14,500 to about 16,000 sequestration pens, about 15,000 to about 16,500 sequestration pens, about 15,500 to about 17,000 sequestration pens, about 16,000 to about 17,500 sequestration pens, about 16,500 to about 18,000 sequestration pens, about 17,000 to about 18,500 sequestration pens, about 17,500 to about 19,000 sequestration pens, about 18,000 to about 19,500 sequestration pens, about 18,500 to about 20,000 sequestration pens, about 19,000 to about 20,500 sequestration pens, about 19,500 to about 21,000 sequestration pens, or about 20,000 to about 21,500 sequestration pens.

Figure 3A:
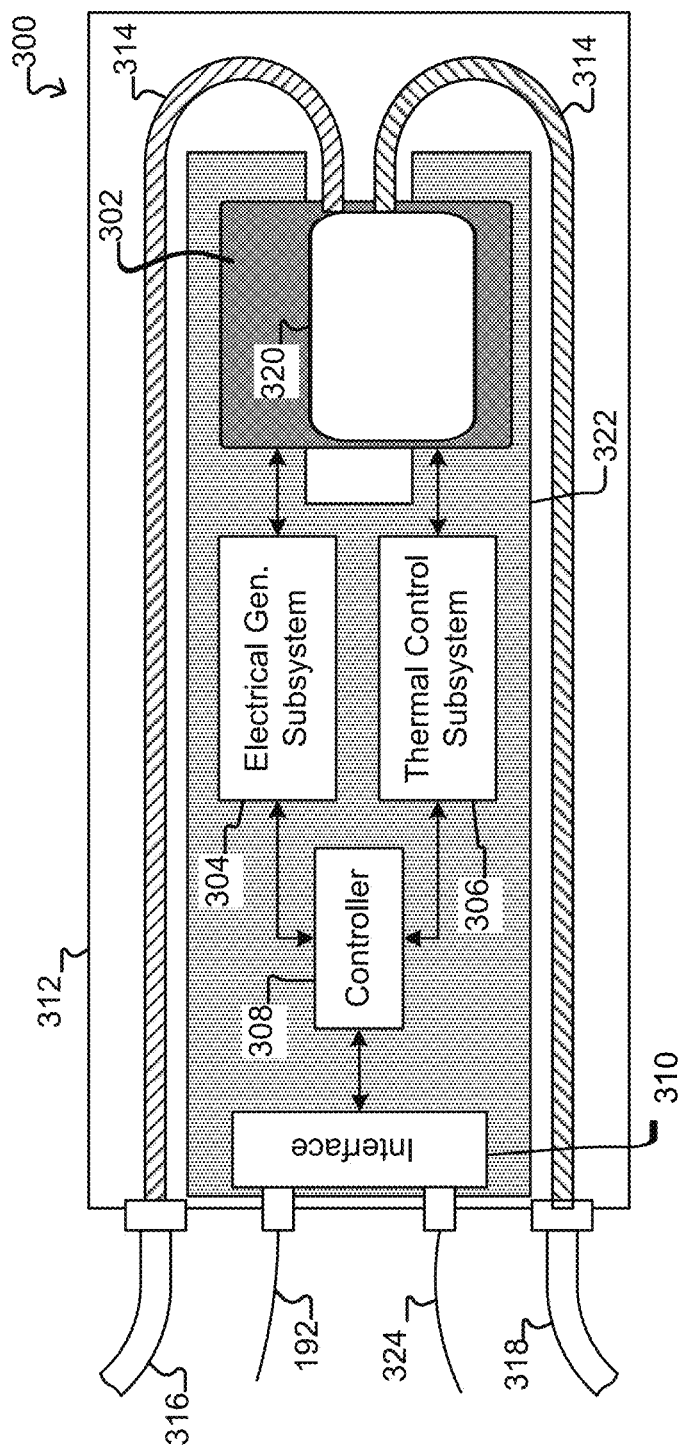
FIG. 3A illustrates a specific example of a nest configured to hold and electronically couple with a microfluidic device according to some embodiments of the invention.
Figure 3B:
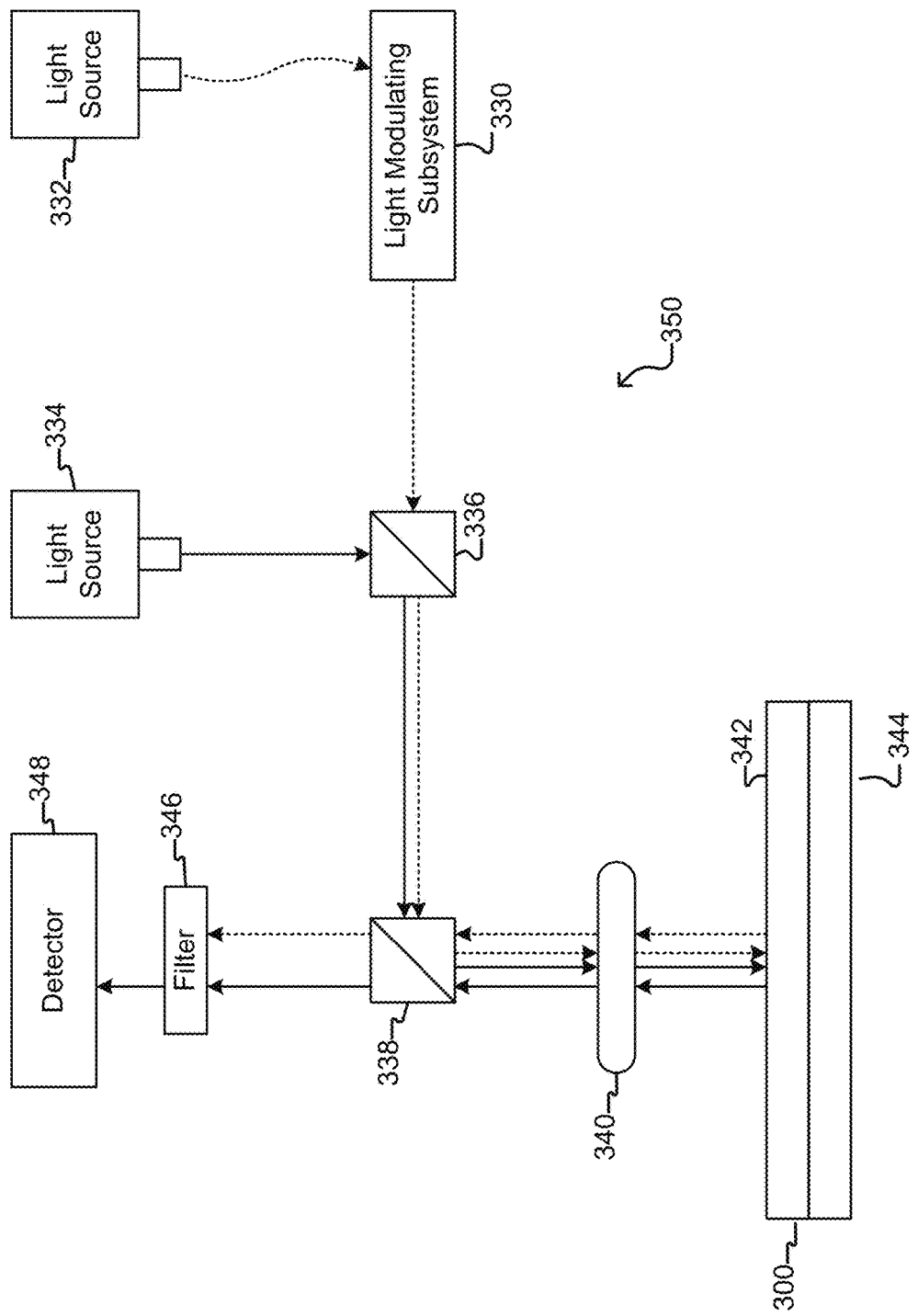
FIG. 3B illustrates various components of a system for operating a microfluidic device according to some embodiments of the invention.

Systems. FIGS. 3A and 3B shows various embodiments of system 150 which can be used to operate and observe microfluidic devices (e.g. 100, 200, 230, 280, 250, 290, 320) according to the present invention. As illustrated in FIG. 3A, the system 150 can include a structure ("nest") 300 configured to hold a microfluidic device 100 (not shown), or any other microfluidic device described herein. The nest 300 can include a socket 302 capable of interfacing with the microfluidic device 320 (e.g., an optically-actuated electrokinetic device 100) and providing electrical connections from power source 192 to microfluidic device 320. The nest 300 can further include an integrated electrical signal generation subsystem 304. The electrical signal generation subsystem 304 can be configured to supply a biasing voltage to socket 302 such that the biasing voltage is applied across a pair of electrodes in the microfluidic device 320 when it is being held by socket 302. Thus, the electrical signal generation subsystem 304 can be part of power source 192. The ability to apply a biasing voltage to microfluidic device 320 does not mean that a biasing voltage will be applied at all times when the microfluidic device 320 is held by the socket 302. Rather, in most cases, the biasing voltage will be applied intermittently, e.g., only as needed to facilitate the generation of electrokinetic forces, such as dielectrophoresis or electro-wetting, in the microfluidic device 320.

As illustrated in FIG. 3A, the nest 300 can include a printed circuit board assembly (PCBA) 322. The electrical signal generation subsystem 304 can be mounted on and electrically integrated into the PCBA 322. The exemplary support includes socket 302 mounted on PCBA 322, as well.

Typically, the electrical signal generation subsystem 304 will include a waveform generator (not shown). The electrical signal generation subsystem 304 can further include an oscilloscope (not shown) and/or a waveform amplification circuit (not shown) configured to amplify a waveform received from the waveform generator. The oscilloscope, if present, can be configured to measure the waveform supplied to the microfluidic device 320 held by the socket 302. In certain embodiments, the oscilloscope measures the waveform at a location proximal to the microfluidic device 320 (and distal to the waveform generator), thus ensuring greater accuracy in measuring the waveform actually applied to the device. Data obtained from the oscilloscope measurement can be, for example, provided as feedback to the waveform generator, and the waveform generator can be configured to adjust its output based on such feedback. An example of a suitable combined waveform generator and oscilloscope is the Red Pitaya™.

In certain embodiments, the nest 300 further comprises a controller 308, such as a microprocessor used to sense and/or control the electrical signal generation subsystem 304. Examples of suitable microprocessors include the Arduino™ microprocessors, such as the Arduino Nano™. The controller 308 may be used to perform functions and analysis or may communicate with an external master controller 154 (shown in FIG. 1A) to perform functions and analysis. In the embodiment illustrated in FIG. 3A the controller 308 communicates with a master controller 154 through an interface 310 (e.g., a plug or connector).

In some embodiments, the nest 300 can comprise an electrical signal generation subsystem 304 comprising a Red Pitaya™ waveform generator/oscilloscope unit ("Red Pitaya unit") and a waveform amplification circuit that amplifies the waveform generated by the Red Pitaya unit and passes the amplified voltage to the microfluidic device 100. In some embodiments, the Red Pitaya unit is configured to measure the amplified voltage at the microfluidic device 320 and then adjust its own output voltage as needed such that the measured voltage at the microfluidic device 320 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 100.

As illustrated in FIG. 3A, the support structure 300 can further include a thermal control subsystem 306. The thermal control subsystem 306 can be configured to regulate the temperature of microfluidic device 320 held by the support structure 300. For example, the thermal control subsystem 306 can include a Peltier thermoelectric device (not shown) and a cooling unit (not shown). The Peltier thermoelectric device can have a first surface configured to interface with at least one surface of the microfluidic device 320. The cooling unit can be, for example, a cooling block (not shown), such as a liquid-cooled aluminum block. A second surface of the Peltier thermoelectric device (e.g., a surface opposite the first surface) can be configured to interface with a surface of such a cooling block. The cooling block can be connected to a fluidic path 314 configured to circulate cooled fluid through the cooling block. In the embodiment illustrated in FIG. 3A, the support structure 300 comprises an inlet 316 and an outlet 318 to receive cooled fluid from an external reservoir (not shown), introduce the cooled fluid into the fluidic path 314 and through the cooling block, and then return the cooled fluid to the external reservoir. In some embodiments, the Peltier thermoelectric device, the cooling unit, and/or the fluidic path 314 can be mounted on a casing 312 of the support structure 300. In some embodiments, the thermal control subsystem 306 is configured to regulate the temperature of the Peltier thermoelectric device so as to achieve a target temperature for the microfluidic device 320. Temperature regulation of the Peltier thermoelectric device can be achieved, for example, by a thermoelectric power supply, such as a Pololu™ thermoelectric power supply (Pololu Robotics and Electronics Corp.). The thermal control subsystem 306 can include a feedback circuit, such as a temperature value provided by an analog circuit. Alternatively, the feedback circuit can be provided by a digital circuit.

In some embodiments, the nest 300 can include a thermal control subsystem 306 with a feedback circuit that is an analog voltage divider circuit (not shown) which includes a resistor (e.g., with resistance 1 kOhm+/−0.1%, temperature coefficient +/−0.02 ppm/C0) and a NTC thermistor (e.g., with nominal resistance 1 kOhm+/−0.01%). In some instances, the thermal control subsystem 306 measures the voltage from the feedback circuit and then uses the calculated temperature value as input to an on-board PID control loop algorithm. Output from the PID control loop algorithm can drive, for example, both a directional and a pulse-width-modulated signal pin on a Pololu™ motor drive (not shown) to actuate the thermoelectric power supply, thereby controlling the Peltier thermoelectric device.

The nest 300 can include a serial port 324 which allows the microprocessor of the controller 308 to communicate with an external master controller 154 via the interface 310. In addition, the microprocessor of the controller 308 can communicate (e.g., via a Plink tool (not shown)) with the electrical signal generation subsystem 304 and thermal control subsystem 306. Thus, via the combination of the controller 308, the interface 310, and the serial port 324, the electrical signal generation subsystem 304 and the thermal control subsystem 306 can communicate with the external master controller 154. In this manner, the master controller 154 can, among other things, assist the electrical signal generation subsystem 304 by performing scaling calculations for output voltage adjustments. A Graphical User Interface (GUI) (not shown) provided via a display device 170 coupled to the external master controller 154, can be configured to plot temperature and waveform data obtained from the thermal control subsystem 306 and the electrical signal generation subsystem 304, respectively. Alternatively, or in addition, the GUI can allow for updates to the controller 308, the thermal control subsystem 306, and the electrical signal generation subsystem 304.

As discussed above, system 150 can include an imaging device 194. In some embodiments, the imaging device 194 comprises a light modulating subsystem 330 (See FIG. 3B). The light modulating subsystem 330 can include a digital mirror device (DMD) or a microshutter array system (MSA), either of which can be configured to receive light from a light source 332 and transmits a subset of the received light into an optical train of microscope 350. Alternatively, the light modulating subsystem 330 can include a device that produces its own light (and thus dispenses with the need for a light source 332), such as an organic light emitting diode display (OLED), a liquid crystal on silicon (LCOS) device, a ferroelectric liquid crystal on silicon device (FLCOS), or a transmissive liquid crystal display (LCD). The light modulating subsystem 330 can be, for example, a projector. Thus, the light modulating subsystem 330 can be capable of emitting both structured and unstructured light. One example of a suitable light modulating subsystem 330 is the Mosaic™ system from Andor Technologies™. In certain embodiments, imaging module 164 and/or motive module 162 of system 150 can control the light modulating subsystem 330.

In certain embodiments, the imaging device 194 further comprises a microscope 350. In such embodiments, the nest 300 and light modulating subsystem 330 can be individually configured to be mounted on the microscope 350. The microscope 350 can be, for example, a standard research-grade light microscope or fluorescence microscope. Thus, the nest 300 can be configured to be mounted on the stage 344 of the microscope 350 and/or the light modulating subsystem 330 can be configured to mount on a port of microscope 350. In other embodiments, the nest 300 and the light modulating subsystem 330 described herein can be integral components of microscope 350.

In certain embodiments, the microscope 350 can further include one or more detectors 348. In some embodiments, the detector 348 is controlled by the imaging module 164. The detector 348 can include an eye piece, a charge-coupled device (CCD), a camera (e.g., a digital camera), or any combination thereof. If at least two detectors 348 are present, one detector can be, for example, a fast-frame-rate camera while the other detector can be a high sensitivity camera. Furthermore, the microscope 350 can include an optical train configured to receive reflected and/or emitted light from the microfluidic device 320 and focus at least a portion of the reflected and/or emitted light on the one or more detectors 348. The optical train of the microscope can also include different tube lenses (not shown) for the different detectors, such that the final magnification on each detector can be different.

In certain embodiments, imaging device 194 is configured to use at least two light sources. For example, a first light source 332 can be used to produce structured light (e.g., via the light modulating subsystem 330) and a second light source 334 can be used to provide unstructured light. The first light source 332 can produce structured light for optically-actuated electrokinesis and/or fluorescent excitation, and the second light source 334 can be used to provide bright field illumination. In these embodiments, the motive module 164 can be used to control the first light source 332 and the imaging module 164 can be used to control the second light source 334. The optical train of the microscope 350 can be configured to (1) receive structured light from the light modulating subsystem 330 and focus the structured light on at least a first region in a microfluidic device, such as an optically-actuated electrokinetic device, when the device is being held by the nest 300, and (2) receive reflected and/or emitted light from the microfluidic device and focus at least a portion of such reflected and/or emitted light onto detector 348. The optical train can be further configured to receive unstructured light from a second light source and focus the unstructured light on at least a second region of the microfluidic device, when the device is held by the nest 300. In certain embodiments, the first and second regions of the microfluidic device can be overlapping regions. For example, the first region can be a subset of the second region. The optical train can be further configured to receive unstructured light from a second light source and focus the unstructured light on at least a second region of the microfluidic device, when the device is held by the nest 300. In certain embodiments, the first and second regions of the microfluidic device can be overlapping regions. For example, the first region can be a subset of the second region. In other embodiments, the second light source 334 may additionally or alternatively include a laser, which may have any suitable wavelength of light. The representation of the optical system shown in FIG. 3B is a schematic representation only, and the optical system may include additional filters, notch filters, lenses and the like. When the second light source 334 includes one or more light source(s) for brightfield and/or fluorescent excitation, as well as laser illumination the physical arrangement of the light source(s) may vary from that shown in FIG. 3B, and the laser illumination may be introduced at any suitable physical location within the optical system. The schematic locations of light source 432 and light source 402/light modulating subsystem 404 may be interchanged as well.

In FIG. 3B, the first light source 332 is shown supplying light to a light modulating subsystem 330, which provides structured light to the optical train of the microscope 350 of system 355 (not shown). The second light source 334 is shown providing unstructured light to the optical train via a beam splitter 336. Structured light from the light modulating subsystem 330 and unstructured light from the second light source 334 travel from the beam splitter 336 through the optical train together to reach a second beam splitter (or dichroic filter 338, depending on the light provided by the light modulating subsystem 330), where the light gets reflected down through the objective 336 to the sample plane 342. Reflected and/or emitted light from the sample plane 342 then travels back up through the objective 340, through the beam splitter and/or dichroic filter 338, and to a dichroic filter 346. Only a fraction of the light reaching dichroic filter 346 passes through and reaches the detector 348.

In some embodiments, the second light source 334 emits blue light. With an appropriate dichroic filter 346, blue light reflected from the sample plane 342 is able to pass through dichroic filter 346 and reach the detector 348. In contrast, structured light coming from the light modulating subsystem 330 gets reflected from the sample plane 342, but does not pass through the dichroic filter 346. In this example, the dichroic filter 346 is filtering out visible light having a wavelength longer than 495 nm. Such filtering out of the light from the light modulating subsystem 330 would only be complete (as shown) if the light emitted from the light modulating subsystem did not include any wavelengths shorter than 495 nm. In practice, if the light coming from the light modulating subsystem 330 includes wavelengths shorter than 495 nm (e.g., blue wavelengths), then some of the light from the light modulating subsystem would pass through filter 346 to reach the detector 348. In such an embodiment, the filter 346 acts to change the balance between the amount of light that reaches the detector 348 from the first light source 332 and the second light source 334. This can be beneficial if the first light source 332 is significantly stronger than the second light source 334. In other embodiments, the second light source 334 can emit red light, and the dichroic filter 346 can filter out visible light other than red light (e.g., visible light having a wavelength shorter than 650 nm).

Surface modification. Surfaces of materials, devices, and/or apparatuses for manipulation and storage of biomaterials may have native properties that are not optimized for short and/or long term contact with such material, which may include but is not limited to micro-objects (including but not limited to biological micro-objects such as biological cells), biomolecules, fragments of the biomolecules or biological micro-objects, and any combination thereof. It may be useful to modify one or more surfaces of a material, device or apparatus to decrease one or more undesired phenomena associated with a native surface in contact with one or more biomaterials. In other embodiments, it may be useful to enhance surface properties of the material, device, and/or apparatus to introduce a desired characteristic to the surface, thereby broadening the handling, manipulation or processing capabilities of the material, device, and/or apparatus. To that end, molecules which can modify a surface to either decrease undesired properties or introduce desirable properties are needed.

Compounds useful for modification of surfaces. In various embodiments, a surface modifying compound may include a surface modifying ligand which may be a non-polymeric moiety such as an alkyl moiety or a substituted alkyl moiety, such as a fluoroalkyl moiety (including but not limited to a perfluoroalkyl moiety) which covalently modifies the surface to which it is attached. The surface modifying compound also includes a connecting moiety, which is the group which covalently attaches the surface modifying ligand to the surface, as shown schematically in Equation 1. The covalently modified surface has the surface modifying ligand attached via a linking group LG, which is the product of the reaction of the connecting moiety with functional groups of the surface (including hydroxide, oxide, amine or sulfur).

Equation 1

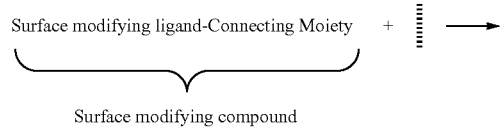

Surface modifying compound

-continued

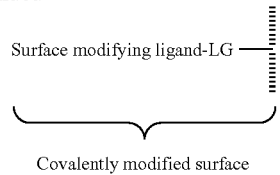

Covalently modified surface

In some embodiments, the surface modifying compound may include carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the connecting moiety.

In various embodiments, the surface modifying compound may have a structure of Formula I:

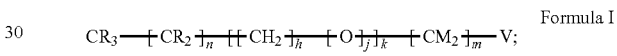

Formula I wherein a connecting moiety V is —P(O)(OH)Q- or —Si(T)$_2$W; W is -T, —SH, or —NH$_2$ and is the moiety configured to connect to the surface; Q is —OH and is the moiety configured to connect to the surface; and T is OH, OC$_{1\text{-}3}$alkyl, or Cl. R is hydrogen or fluorine and M is hydrogen or fluorine. Each instance of h independently is an integer of 2 or 3; j is 0 or 1; k is 0 or is 1; m is 0 or an integer of 1 to 25; and n is 0 or an integer of 1 to 25. In some other embodiments, the sum of (n+[(h+j)·k]+m) may be an integer of 11 to 25. In some embodiments, M is hydrogen. In various embodiments, m is 2. In some embodiments, k is 0. In other embodiments, k is 1. In various embodiments, j is 1. For the compound of Formula I, when k is an integer of 1, then m may be at least 2 and M is hydrogen. For the compound of Formula I, when k is 0 and R is fluorine, then m may be at least 2 and M is hydrogen.

In various embodiments, where the surface modifying compound has a structure of Formula I, the connecting moiety V may be —Si(T)$_2$W, where T and W are defined as above. W may be OC$_{1\text{-}3}$alkyl, or Cl. W may be methoxy, ethoxy or propoxy. In some embodiments, W may be methoxy. T may be may be OC$_{1\text{-}3}$alkyl, or Cl. In various embodiments, connecting moiety V is —Si(OMe)$_3$. In various other embodiments, V may be —P(O)(OH)Q, where Q is OH.

The surface modifying compound of Formula 1 may have a preferred range of number of atoms making up the linear backbone of the compound. As defined above each of the segments that make up the compound of Formula 1 may have a range of sizes. Accordingly, a compound of Formula 1 may have repeating units as defined above such that (n+[(h+j)·k]+m) is equal to 25, which would yield a total length of 26 atoms, including the terminal CR$_3$— group, attached to the connecting moiety. In the instance of (n+[(h+j)·k]+m) equal to 25, a variety of different compositions can be encompassed. For instance, the segment —[CR$_2$]$_n$— may have n=23; —[(CH$_2$)$_h$—(O)$_j$]$_k$— may have k=0; and —[CM$_2$]$_n$- may have m=2. Another instance having the same total (n+[(h+j)·k]+m) equal to 25, may have segment —[CR$_2$]$_m$— where n=6; —[(CH2)h-(O)j]k- where k=3, and includes j=1 and h=2; and —[CM$_2$]$_m$- may have m=4.

In some embodiments, the sum of (n+[(h+j)·k]+m) may be 11, 13, 15, 17, or 21. In other embodiments, the sum of (n+[(h+j)·k]+m) may be 15 or 17. In yet other embodiments, the sum of (n+[(h+j)·k]+m) may be 13 or 15.

In some embodiments, one or more ether linkages may be present in the compound of Formula I. In some embodiments, j may be 1. In some embodiments, where k and j are both 1, m may be at least two.

In yet other embodiments, backbone carbons may be fluorinated. In some embodiments, backbone carbons may be perfluorinated, where each R of CR$_3$—, and/or —[CR$_2$]$_n$— and/or —[CM$_2$]$_m$- may be fluorinated. In some embodiments, a section of the compound may have carbon backbone atoms that are fluorinated and other sections of the compound may have carbon backbone atom that are substituted with hydrogen. For example, in some embodiments, CR$_3$— and —[CR$_2$]$_n$— segments may have fluorine non-backbone substituents (e.g., R is fluorine) while —[CM]$_m$- segments may have hydrogen nonbackbone substituents (e.g., M is hydrogen). In some embodiments, when R is fluorine, then k is 0. In other embodiments, R may be fluorine and k is 1, j is 1 and h is 2. In various embodiments, M may be hydrogen.

In yet other embodiments, the compound of Formula 1 may be synthesized from hydrosilation of an olefin as described below, where m is at least two and M is hydrogen. In some embodiments, m is 2 and M is hydrogen.

Some of the variety of compounds of Formula I may be more readily seen in subsets of compounds described in the following formulae, but these formulae are in no way limiting to the breadth of Formula I.

In some embodiments, the compound of Formula I may include a compound of Formula 110:

CH$_3$(CH$_2$)$_m$Si(OC$_{1-3}$alkyl)$_3$;                   Formula 110 where m is an integer of 9 to 23. In some embodiments, m may be 11, 13, 15, 17, or 19. In some other embodiments m may be 13 or 15.

In other embodiments, the compound of Formula I may include a compound of Formula 111:

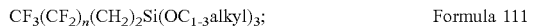
CF$_3$(CF$_2$)$_n$(CH$_2$)$_2$Si(OC$_{1-3}$alkyl)$_3$;           Formula 111 where n may be an integer of 9 to 22. Alternatively, n may be an integer of 11 to 17. In some other embodiments, n may be 9, 11, 13, or 15. In some embodiments, n may be 13 or 15.

In yet other embodiments, the compound of Formula I may include a compound of Formula 112:

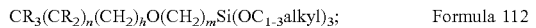
CR$_3$(CR$_2$)$_n$(CH$_2$)$_h$O(CH$_2$)$_m$Si(OC$_{1-3}$alkyl)$_3$;      Formula 112 where n is an integer of 3 to 19; h is an integer of 2 or 3; and m is an integer of 2 to 18. In some embodiments, R may be fluorine. In some embodiments n may be an integer of 3 to 11, h may be 2, and m may be an integer of 2 to 15.

Alternatively, the compound of Formula I may include a compound of Formula 113:

CR$_3$(CR$_2$)$_n$(CM$_2$)$_m$P(O)(OH)$_2$;              Formula 113 where n is an integer of 3 to 21; and m is an integer of 2 to 21. In some embodiments of the compound of Formula 113, R may be fluorine. In some embodiments, M may be hydrogen. In various embodiments, n may be 5, 7, 9, or 11. In other embodiments, m may be 2, 4, 5, 7, 9, 11 or 13.

Surfaces for modification. A surface capable of being modified by the surface modifying compounds described herein, including a compound of Formula I, may be a metal, metal oxide, glass or polymer. Some materials that may have a covalently modified surface introduced therein in may include but not be limited to silicon and its oxides, silicones, aluminum or its oxide thereof (Al$_2$O$_3$), Iridium Tantalum Oxide (ITO), titanium dioxide (TiO$_2$), zirconium oxide (ZrO$_2$), hafnium(IV) oxide (HfO$_2$), tantalum (V) oxide (Ta$_2$O$_5$), or any combination thereof. The surface may be a wafer or sheet of these materials, or may be incorporated within an apparatus or device. In some embodiments, the surface including any of these materials may be incorporated within a microfluidic device as described herein.

Polymers may include any suitable polymer. A suitable polymer may include but is not limited to (e.g. rubber, plastic, elastomer, silicone, organosilicone, such as polydimethylsiloxane ("PDMS"), or the like), which can be gas permeable. Other examples can include molded glass, a patternable material such as a silicone polymer (e.g. photo-patternable silicone or "PPS"), photo-resist (e.g., an epoxy-based photo-resist such as SU8), or the like. In other embodiments, a surface of a material such as a natural fiber or wood may be functionalized by the surface modifying compounds described herein, including a compound of Formula I, to introduce a covalently modified surface.

The surface to be modified may include a nucleophilic moiety including but not limited to hydroxide, amino and thiol. The nucleophilic moiety (e.g., hydroxide (in some embodiments referred to as oxide)) on the surface may react with the surface modifying compounds described herein, including a compound of Formula I, to covalently link the surface modifying ligand to the surface, via a siloxy linking group or phosphonate linking group, to provide the functionalized surface. The surface to be modified may include native nucleophilic moieties, or may be treated with reagents (e.g., piranha solution) or by plasma treatment to introduce nucleophilic moieties (e.g., hydroxide (alternatively referred to as oxide)).

In some embodiments, the surface may be formed from any of the above materials, singly or in any combination. The surface may include a semiconductor substrate. In various embodiments, the surface including a semiconductor substrate may further include a DEP or EW substrate as described herein. In some embodiments, the surface including a semiconductor substrate having a DEP or EW substrate may be part of a microfluidic device as described herein.

In some embodiments, the modified surface may be at least one inward-facing surface of a microfluidic device as described herein. The at least one surface may be part of the flow region of the microfluidic device (which may include a channel) or may include a surface of an enclosed structure such as a pen, which may include a sequestration pen as described herein.

Covalently modified surface. A covalently modified surface may include a surface modifying ligand, which may be a non-polymeric moiety such as an alkyl moiety, a substituted alkyl moiety, such as a fluoroalkyl moiety (including but not limited to a perfluoroalkyl moiety) and may be any surface modifying ligand described above, which is covalently bound to the surface via a linking group, which is the moiety resultant from reaction of the connecting moiety with the surface. The linking group may be a siloxy linking group or a phosphonate linking group.

In some embodiments, the surface modifying ligand may include carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

Covalently modified surface of Formula II. In some embodiments, a covalently modified surface has a structure of Formula II:

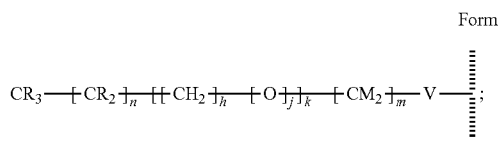

Formula II wherein is the surface; V is —P(O)(OY)W— or —Si(OZ)$_2$W. W is —O—, —S—, or —NH— and connects to the surface. Z is a bond to an adjacent silicon atom attached to the surface or is a bond to the surface. Y is a bond to an adjacent phosphorus atom attached to the surface or is a bond to the surface. For the covalently modified surface of Formula II, R, M, h, j, k, m, and n are as defined above. When k is an integer of 1, then m is at least 2 and M is hydrogen. When k is 0 and R is fluorine, then m is at least 2 and M is hydrogen. The covalently modified surface of Formula II can be described as a surface modifying ligand attached via a linking group LG, as in Formula IIA, where LG is linked to the surface:

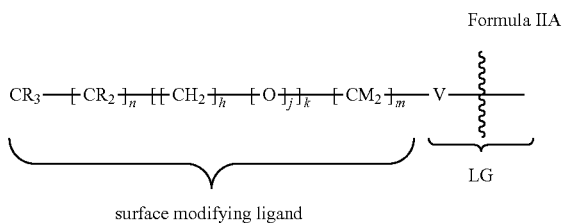

Formula IIA

The covalently modified surface may include any surface of Formula II, in any combination, as described above for the surface modifying compound of Formula I.

In some embodiments, the covalently modified surface of Formula II may be a surface of Formula 210:

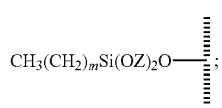

Formula 210 wherein is the surface, oxygen attached to the silicon atom is also bound to the surface, and m is an integer of 11 to 23.

In some embodiments, m may be 11, 13, 15, 17, or 19. In some other embodiments m may be 13 or 15.

In some other embodiments, the covalently modified surface of Formula II may be a surface of Formula 211:

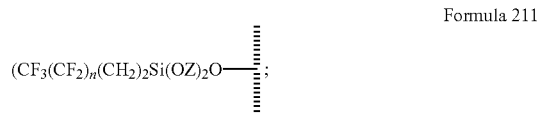

Formula 211 wherein is the surface, oxygen attached to the silicon atom is also bound to the surface, and n may be an integer of 9 to 22. Alternatively, n may be an integer of 11 to 17. In some other embodiments, n may be 7, 9, 11, 13, or 15. In some embodiments, n may be 13 or 15.

In yet other embodiments, the covalently modified surface of Formula II may be a surface of Formula 212:

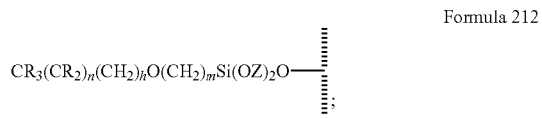

Formula 212 wherein is the surface, oxygen attached to the silicon atom is also bound to the surface, and n is an integer of 3 to 21, h is an integer of 2 or 3, and m is an integer of 2 to 21. In some embodiments, R may be fluorine. In some embodiments, n may be an integer of 3 to 11, h may be 2, and m may be an integer of 2 to 15.

Alternatively, the covalently modified surface of Formula II may be a surface of Formula 213:

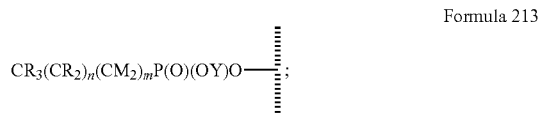

Formula 213 wherein is the surface, oxygen attached to the phosphorus atom is also bound to the surface, n is an integer of 3 to 21 and m is an integer of 2 to 21. In some embodiments of the compound of Formula 113, R may be fluorine. In some embodiments, M may be hydrogen. In various embodiments, n may be 5, 7, 9, or 11. In other embodiments, m may be 2, 4, 5, 7, 9, 11 or 13.

In some embodiments, the microfluidic device comprises a flow region fluidically connected to a first inlet and a first outlet, the flow region configured to contain a flow of a first fluidic medium. The microfluidic device may include one or more chambers opening to the flow region. The covalently modified surface may be a covalently modified substrate of the microfluidic device and may underlay the flow region and/or at least one chamber. In some embodiments, all or substantially all the interior surfaces of the microfluidic device configured to face fluid have a covalently modified surface of Formula II.

Figure 2D:
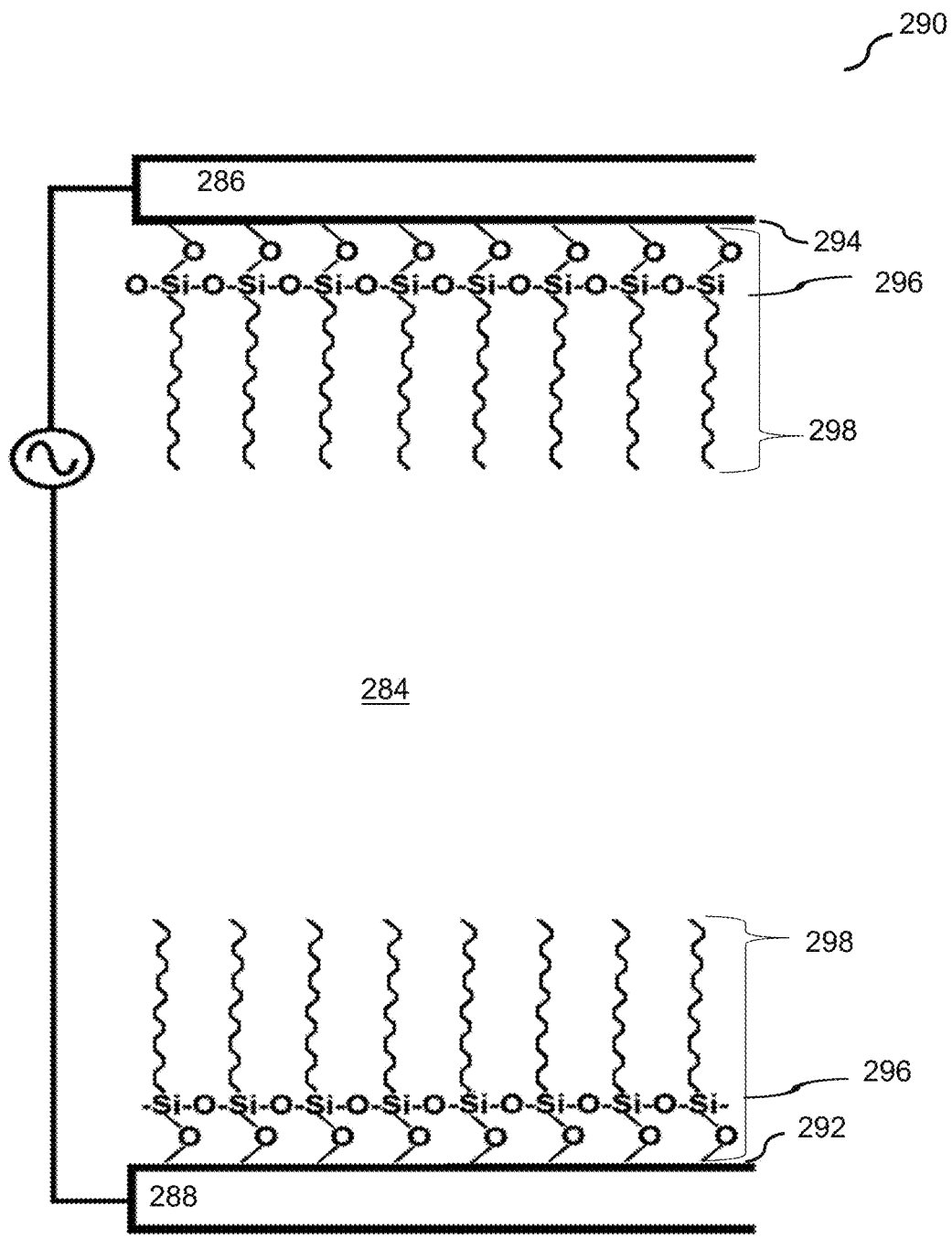
FIG. 2D illustrates a coated surface of the microfluidic device according to an embodiment of the invention.

FIG. 2D depicts a cross-sectional view of a microfluidic device 290 comprising an exemplary covalently modified surface 298. As illustrated, the covalently modified surface 298 (shown schematically) can comprise a monolayer of densely-packed molecules covalently bound to both the inner surface 294 of the substrate 286 and the inner surface 292 of the cover 288 of the microfluidic device 290. The covalently modified surface s 298 can be disposed on substantially all inner surfaces 294, 292 proximal to, and facing inwards towards, the enclosure 284 of the microfluidic device 290, including, in some embodiments and as discussed above, the surfaces of microfluidic circuit material (not shown) used to define circuit elements and/or structures within the microfluidic device 290. In alternate embodiments, the covalently modified surface 298 can be disposed on only one or some of the inner surfaces of the microfluidic device 290.

In the embodiment shown in FIG. 2D, the covalently modified surface 298 comprises a monolayer of alkyl-terminated siloxane molecules, each molecule covalently bonded to the inner surfaces 292, 294 of the microfluidic device 290 via a siloxy linker 296. For simplicity, additional silicon oxide bonds are shown linking to adjacent silicon atoms, but the invention is not so limited. In some embodiments, the covalently modified surface 298 can comprise a fluoroalkyl group (e.g. a fluorinated alkyl group or a perfluorinated alkyl group) at its enclosure-facing terminus (i.e. the portion of the monolayer of the surface modifying ligand 298 that is not bound to the inner surfaces 292, 294 and is proximal to the enclosure 284). While FIG. 2D is discussed as having an alkyl-terminated modified surface, any suitable surface modifying compound may be used, as described herein.

Native surface. The at least one surface of the microfluidic device to be modified may be glass, metal, metal oxide or polymer. Some materials that may be incorporated within the microfluidic device and may be modified to have a covalently modified surface of Formula II introduced therein in may include but not be limited to silicon and its oxides, silicones, aluminum or its oxide thereof ($Al_2O_3$), Indium Tantalum Oxide (ITO), titanium dioxide ($TiO_2$), zirconium oxide ($ZrO_2$), hafnium(IV) oxide ($HfO_2$), tantalum (V) oxide ($Ta_2O_5$), or any combination thereof. Polymers may include any suitable polymer. A suitable polymer may include but is not limited to (e.g. rubber, plastic, elastomer, silicone, organosilicone, such as polydimethylsiloxane ("PDMS"), or the like), which can be gas permeable. Other examples can include molded glass, a patternable material such as a silicone polymer (e.g. photo-patternable silicone or "PPS"), photo-resist (e.g., an epoxy-based photo-resist such as SU8), or the like.

Physical and performance properties of the covalently modified surface. In some embodiments, the covalently modified surface may have increased hydrophobic character. The increased hydrophobic character of the modified surface may prevent fouling by biomaterials. Surface fouling, as used herein, refers to the amount of material indiscriminately deposited on the surface of the microfluidic device, which may include permanent or semi-permanent deposition of biomaterials such as protein and degradation products, nucleic acids, and respective degradation products. Such fouling can increase the amount of adhesion of biological micro-objects to the surface. In other embodiments, increased hydrophobic character of a covalently modified surface may decrease adhesion of biological micro-objects on the surface, independently of adhesion initiated by surface fouling.

Modification of the surface may increase the durability, functionality, and/or biocompatibility of the surface. Each of these characteristics may further benefit the viability (including growth rate and/or cell doubling rate), nature of the colony formed upon a covalently modified surface as described herein, including a surface having a structure of Formula II, or portability (including viability upon export) of micro-objects or biomolecules upon the modified surface and within devices and/or apparatuses having a covalently modified surface.

In some embodiments, the covalently modified surface, which may be any surface as described herein, including a surface of Formula II, may have a thickness of less than 10 nm (e.g., less than about 7 nm, less than about 5 nm, or about 1.5 to 3.0 nm). This may provide an advantageously thin layer on the modified surface, particularly in contrast with other hydrophobic materials such as CYTOP®, a perfluoro tetrahydrofuranyl polymer which is spin-coated yielding a typical thickness of about 30 to 50 nm. Data shown in Table 1 is for a silicon/silicon oxide surface which is treated to have a covalently modified surface as shown in the table. Contact angle measurements were obtained using the static sessile drop method. (Drelich, J. Colloid Interface Sci. 179, 37-50, 1996.) Thickness was measured by ellipsometry.

Contact angle hysteresis measurements were performed using a Biolin Scientific contact angle goniometer. Chemically modified OEW surfaces were placed in a bath of 5 cSt silicone oil encased in a transparent holder. A phosphate buffered saline (PBS) droplet was then dispensed onto the surface in the oil. A platinum (Pt) wire electrode was inserted into the droplet, and the sessile water contact angle was measured. Next, an applied AC voltage of 50 Vppk at 30 kHz frequency was applied between the OEW substrate and the Pt wire inserted into the PBS droplet for 10 seconds. Next, the applied voltage was removed, and the contact angle was measured again. The contact angle hysteresis was calculated by subtracting the contact angle at zero bias after applying the 50 Vppk AC voltage from the original contact angle at zero bias before applying the voltage.

TABLE 1

Physical data for selected surfaces.

| No. | Modified Surface | Contact Angle (water or aqueous solution) | Contact angle hysteresis | Thickness |
|---|---|---|---|---|
| 201 | $CH_3(CH_2)_{17}$-Si(OT)$_2$O-(surface) | 110-112° | 5°, less than 10° data | Approx. 2 nm |
| 202 | $CF_3(CF_2)_{13}(CH_2)_2$Si(OT)$_2$O-(surface) | 110-115° | | Approx. 2 nm |
| 203 | $CF_3(CF_2)_7(CH_2)_2$Si(OT)$_2$O-(surface) | 110-115° | >10° | Approx 1 nm |
| 204 | $CH_3(CH_2)_{21}$Si(OT)$_2$O-(surface) | 110-112° | n/a | Approx. 2-2.5 nm |
| 205 | $CH_3(CH_2)_{15}$Si(OT)$_2$O-(surface) | 110-112° | >10° | n/a |
| 206 | $CF_3(CF_2)_5(CH_2)_2O(CH_2)_{11}$Si(OT)$_2$O-(surface) | 110-114° | n/a | Approx. 2 nm |

TABLE 1-continued

Physical data for selected surfaces.

| No. | Modified Surface | Contact Angle (water or aqueous solution) | Contact angle hysteresis | Thickness |
|---|---|---|---|---|
| 207 | $CH_3(CH_2)_{17}P(O)(OQ)O$-(surface) | 110° | n/a | n/a |
| 208 | $CF_3(CF_2)_7(CH_2)_{11}Si(OT)_2O$-(surface) | 113° | n/a | Approx. 2 nm |
| 209 | $CF_3(CF2)_{11}(CH_2)_2Si(OT)_2O$-(surface) | 112° | n/a | Approx.1.5-2 nm |

T and Q are as described above.

The contact angles observed for modified surfaces are in contrast to the contact angle for water on a plasma cleaned silicon surface of less than 10 degrees. Each of these surfaces is less wettable than that of the native silicon/silicon oxide surface.

Other analytical methods suitable to characterize the surface can include infrared spectroscopy and/or X-ray photoelectron spectroscopy.

Another desirable characteristic of the modified surfaces of the invention is a lack of autofluorescence, which can be dependent upon the chemical nature of the surface modifying compound.

In some embodiments, the covalently modified surface described herein, including a surface of Formula II, may form a monolayer. The uniformity and evenness of a monolayer modified surface may provide advantageous performance, particularly if the monolayer modified surface has other functional attributes. For example, the covalently modified surface described herein, including a surface of Formula II, may also include an electrode activation substrate, and optionally further may include a dielectric layer, as may be found in materials, devices and/or apparatuses having a dielectrophoresis configuration or an electrowetting configuration. The lack of unsaturation of the perfluoroalkyl moieties of the modified surface can minimize "charge trapping" compared to a monolayer containing, for example olefinic or aromatic moieties. Additionally, the densely packed nature of the monolayer formed in the surface described herein, including a surface of Formula II, may minimize the potential for cations to be driven through the monolayer to the underlying metal, metal oxide, glass or polymer substrate. Without being limited by theory, the disruption of the substrate surface by addition of cations to substrate composition may disrupt the electrical properties of the substrate, thereby reducing its ability to function electrokinetically.

Further, the ability to introduce the modified surface via a covalent linkage may increase the dielectric strength of the modified surface and protect the underlying material from breakdown under application of an electric field. The uniformity and thinness of an dielectrophoretic or electrowetting surface of a material, device and/or apparatus having a covalently modified surface described herein, including a surface of Formula II, may further provide advantageous benefit for such modified dielectrophoretic and/or electrowetting surface when the material, device and/or apparatus is optically actuated.

Methods of Droplet Generation. As discussed above, for embodiments in which light is projected onto the surface of a substrate of a microfluidic device as a means for actuating an optoelectrowetting (OEW) force, the specific patterns of light that are projected and their movement relative to a fluid reservoir can facilitate the formation (or "pulling") of droplets from the fluid reservoir in a controlled and reproducible manner. These patterns of light and their cross-sectional shapes (i.e., the shapes formed at the surface of the substrate) are referred to herein as "optical droplet actuators." In addition, projected patterns of light can be used to actuate OEW force on the fluid reservoir (or "droplet reservoir") from which droplets are to be pulled. The OEW force actuated by these latter patterns of light can function to immobilize (i.e. "capture" or "pin") the droplet reservoir, thereby providing a force that resists movement of fluid induced by an optical droplet actuator and facilitating the separation of droplets from the fluid reservoir. Of course, as persons skilled in the art will readily understand, the OEW forces used to pull droplets and pin the droplet reservoir can be replaced more generally with electrowetting (EW) forces, which can be induced by standard electrodes that are electrically actuated, as in the case of "electrowetting on dielectric" or "EWOD", or a combination of OEW and EWOD. Microfluidic devices suitable for use in the disclosed methods of droplet formation can have any electrowetting configuration, and more specifically any OEW and/or EWOD configuration, described herein or otherwise known in the art.

Optical droplet actuators suitable for use in the methods disclosed herein can have any of a variety of cross-sectional shapes or geometries. For example, the optical droplet actuators can have a cross-sectional shape that comprises, consists essentially of, or consists of a polygon, which may be either a regular polygon (i.e., all sides and angles are of equal proportion) or an irregular polygon (i.e., at least two sides and angles are of unequal proportion). The polygon shape can be 3-sided (i.e., a triangle), 4-sided (i.e., a rectangle, square, rhombus, trapezoid, or the like), 5-sided (i.e., a pentagon), 6-sided (i.e., a hexagon), 7-sided (i.e., a heptagon), 8-sided (i.e., an octagon), 9-sided, 10-sided, 11-sided, 12-sided, or the like. Alternatively, the optical droplet actuators can have a cross-sectional shape that comprises, consists essentially of, or consists of a shape having curved edges, which may correspond to the edges a circle, an ellipse, a parabola, or the like, and any combination thereof. In some embodiments, cross-sectional shapes having a curved edge can have an overall shape that is polygon-like, as discussed further below. In addition, optical droplet actuators suitable for use in the methods disclosed herein can have cross-sectional shapes that include a combination of at least one straight edge and at least one curved edge. Thus, the optical droplet actuators can have a cross-sectional shape that is a composite of a polygon shape and a shape having curved edges.

In certain embodiments, an optical droplet actuator suitable for use in the methods disclosed herein can include a first portion and a second portion. The first portion can include a "leading edge" oriented generally in a direction that the optical droplet actuator will be moved during the formation of a droplet. The second portion can include a "trailing edge" oriented generally in a direction opposite to the direction that the optical droplet actuator will be moved during the formation of a droplet. The leading edge can have a convex shape (i.e., a shape that extends outwards), which may correspond to the edge of a curved shape, such as a circle, ellipse, parabola, or the like, or to the edge of a polygon shape, such as a pentagon, hexagon, heptagon, octagon, or the like. Alternatively, the leading edge can be substantially straight or can even have a concave shape (i.e., a shape that extends inwards). The concave shape may correspond to the edge of a curved shape or to the edge of a polygon shape. The trailing edge can have a tapered shape, which can be formed by straight lines (e.g., in the manner of two lines of a triangle that converge towards a common point), by curved lines (e.g., two arcs from a circle, ellipse, parabola, or the like that converge towards a common point), or a combination thereof. One example of an optical droplet actuator having a first portion with a convex shape and a second portion with a tapered shape is a tear drop-shaped optical droplet actuator.

Figure 6A:
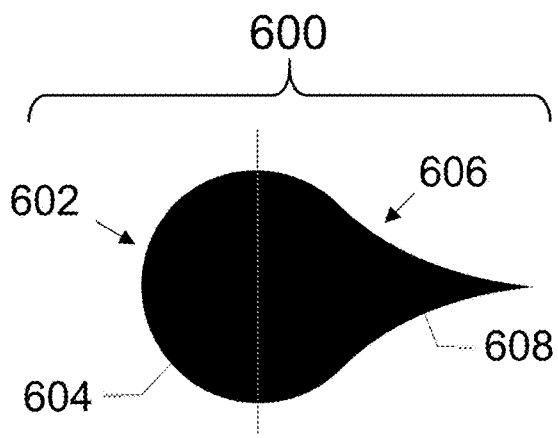
FIGS. 6A-6G illustrate the cross-sectional shapes of optical droplet actuators used to pull child droplets from a reservoir droplet according to various embodiments of the invention.

FIGS. 6A-6G illustrate various examples of optical droplet actuators suitable for use in the disclosed methods. FIG. 6A illustrates an optical droplet actuator 600 having a tear drop shape in cross-section. The grey vertical line (not part of the optical droplet actuator) divides the optical droplet actuator 600 into a first portion 602 and a second portion 606. The first portion 602 has a semi-circular shape of which the circumference defines the leading edge 604; the second portion 606 has a trailing edge 608 that is curved and tapered. As used herein, the term "leading edge" refers to an edge facing towards (either directly or obliquely) the direction of movement of the optical droplet actuator (e.g., if the first portion of the optical droplet actuator has a circular shape, with 0 degrees defined as the direction of movement, the edge of the circle from −90 to +90 degrees would constitute the "leading edge". The term "trailing edge" refers to an edge facing away from (either directly or obliquely) the direction of movement of the optical droplet actuator. The circular shape that makes up most of the cross-sectional shape of optical droplet actuator 600 facilitates droplet generation because it has a geometry that corresponds to the most energetically favorable shape of a droplet (i.e., round), and thereby assists in the initial budding of the droplet from the droplet reservoir. The corresponding geometries also help to ensure consistency in the volume of droplets pulled from the droplet reservoir. In addition, although the tapered part of optical droplet actuator 600 tends to stretch the droplet out of its energetically favorable circular shape, the tapered part facilitates a more consistent narrowing and breaking of the "neck" of fluid that connects a budding droplet to the droplet reservoir prior to droplet separation, and thus also helps to ensure the formation of droplets of a consistent size.

Depending on the size of the cross-sectional area of on optical droplet actuator, a portion that is tapered (e.g., a second portion) can have a length (e.g., along an axis defined by the direction of the optical droplet actuator as it moves away from a droplet reservoir) of at least 100 microns (e.g., at least 200 microns, at least 300 microns, at least 400 microns, or at least 500 microns). The length of a tapered portion of an optical droplet actuator can range from about 100 microns to about 500 microns, or from about 100 to about 200 microns, about 150 to about 300 microns, about 200 to about 400 microns, about 250 to about 500 microns, about 300 to about 600 microns, about 350 to about 700 microns, about 400 to about 800 microns, about 450 to about 900 microns, or about 500 to about 1000 microns.

Figure 4A:
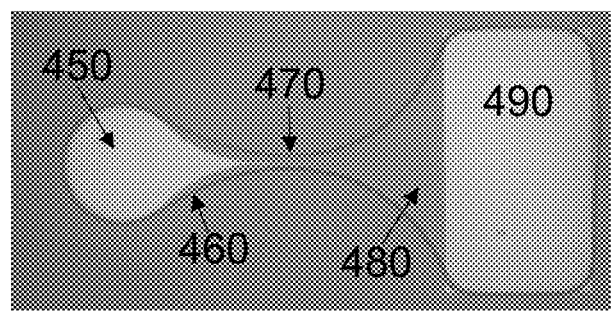
FIGS. 4A-4B depict the use of an optical droplet actuator to pull a child droplet from a droplet reservoir according to some embodiments of the invention.
Figure 4B:
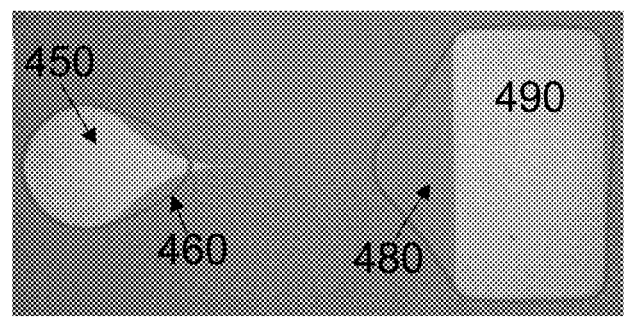
Figure 4C:
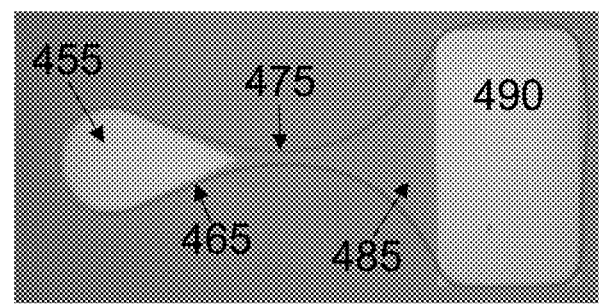
FIGS. 4C-4D depict the use of an optical droplet actuator to pull a child droplet from a droplet reservoir according to some embodiments of the invention.
Figure 4D:
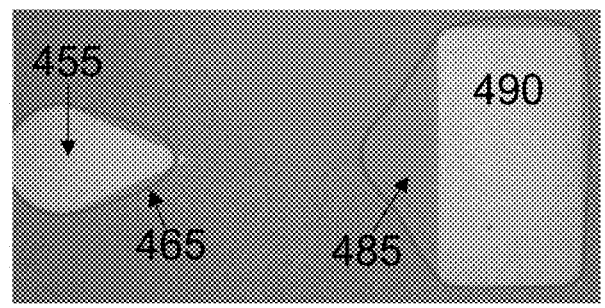

The use of a tear drop-shaped optical droplet actuator to generate droplets from a droplet reservoir is illustrated in FIGS. 4A-4D. In FIGS. 4A-4B, the optical droplet actuator 450 has a shape that is essentially identical to that of optical droplet actuator 600 in FIG. 6A. In FIGS. 4C-4D, the optical droplet actuator 455 has a shape that differs from the optical droplet actuator 600 in FIG. 6A in that the lines that define the trailing edge of the tapered portion are straight rather than curved. FIGS. 4A and 4C each illustrate the neck of fluid 470, 475 that connects a child droplet 460, 465 to a droplet reservoir 480, 485 prior to separation of the child droplet 460, 465 from the droplet reservoir 480, 485. FIGS. 4B and 4D also illustrate how the child droplet 460, 465 typically has a cross-sectional area that is slightly greater than the cross-sectional area of the optical droplet actuator 450, 455 used to pull the droplet.

Figure 6B:
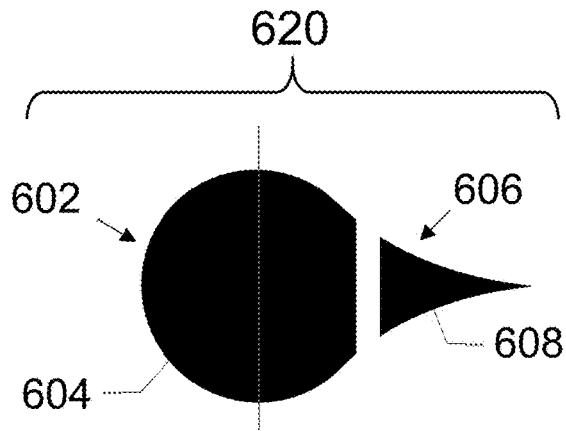
Figure 6C:
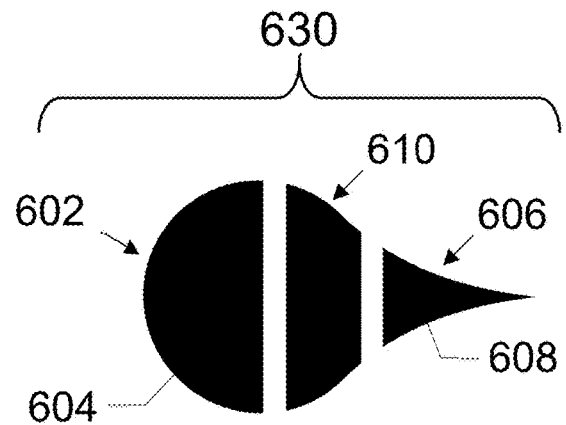

FIGS. 6B and 6C illustrate optical droplet actuators 620 and 630, respectively, each of which has a tear drop shape in cross-section, similar to optical droplet actuator 600 of FIG. 6A. However, optical droplet actuator 620 includes a gap within the second portion 606, while optical droplet actuator 630 includes a first gap within the second portion 606 and a second gap that separates the first portion 602 from the second portion 606. Optical droplet actuators 620 and 630 are considered "composite" optical droplet actuators due to the fact that their cross-sectional areas comprise at least two discrete regions that do not contact one another, wherein optical droplet actuators having a single area, such as optical droplet actuator 600 of FIG. 6A, are considered "contiguous" optical droplet actuators. Similar to the tapered part of the second portion 606 of optical droplet actuator 600 of FIG. 6A, the gap(s) in optical droplet actuators 620 and 630 can facilitate a more consistent narrowing and breaking of the "neck" of fluid that connects a budding droplet to the droplet reservoir prior to droplet separation, and thus help to ensure the formation of droplets of a consistent size. The cross-sectional area of optical droplet actuator 620 is smaller than the cross-sectional area of optical droplet actuator 600, and the cross-sectional area of optical droplet actuator 630 is smaller than the cross-sectional areas of both optical droplet actuators 600 and 620. Despite these smaller cross-sectional areas, each of optical droplet actuators 620 and 630 "defines" a cross-sectional area of substantially the same size as optical droplet actuator 600 due to the fact that all three optical droplet actuators 600, 610, and 620 can be used to pull droplets of substantially the same size.

Figure 6D:
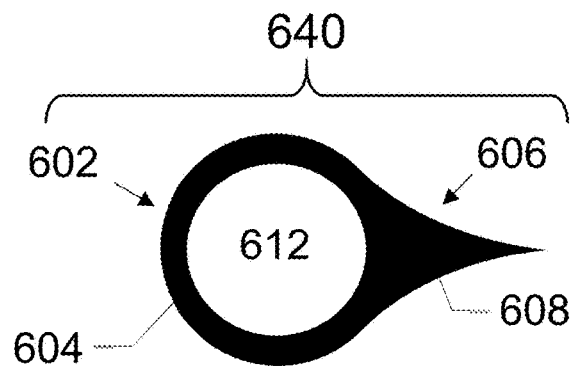
Figure 6E:
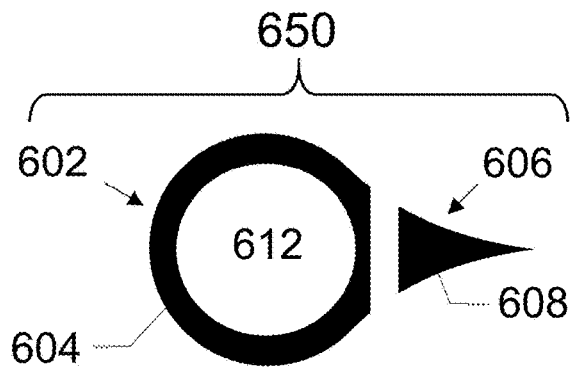

FIGS. 6D and 6E illustrate variations on the optical droplet actuators 600 and 620 of FIGS. 6A and 6B, respectively. In particular, a circular gap 612 is present in the center of optical droplet actuators 640 and 650. This type of a gap reduces the overall light intensity incident upon (and corresponding electrowetting force applied to) droplets as they are pulled from a droplet reservoir, and thus can advantageously avoid unnecessary stress or harm being inflicted upon materials, such as biological cells or molecules, contained within the droplet. Nevertheless, the optical droplet actuators 640 and 650 can still be used efficiently to pull droplets of consistent size from a droplet reservoir. As with optical droplet actuator 600, this size consistency results from the shaping (through the actuation of EW force) of the edges of a droplet by optical droplet actuators 640 and 650, and from the manner in which they facilitate the narrowing and breaking of the neck of fluid that connects a budding droplet to the droplet reservoir prior to droplet separation. Although they have smaller cross-sectional areas than optical droplet actuator 600, optical droplet actuators 640 and 650 each "defines" a cross-sectional area of substantially the same size as optical droplet actuator 600.

Figure 6F:
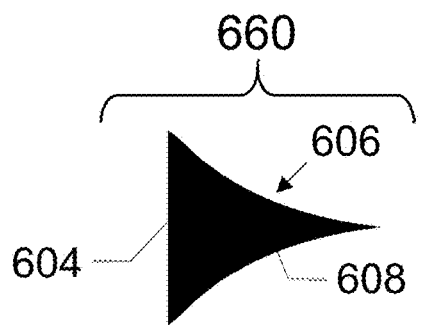
Figure 6G:
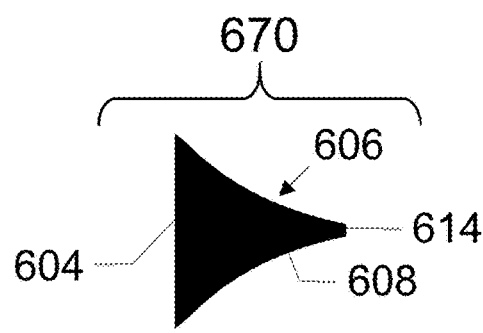

FIGS. 6F and 6G illustrate optical droplet actuators 660 and 670 which, in comparison to optical droplet actuators 600, 620, 630, 640, and 650, lack a first portion 602 and consist primarily of a part of the second portion 606. Alternatively, optical droplet actuators 660 and 670 can be viewed as having polygon-like cross-sectional shapes. For example, optical droplet actuator 660 has a triangle-like cross-sectional shape which differs from a true triangular shape due to the inward curving of the lines that define the trailing edge 608, while optical droplet actuator 670 has a trapezoid-like cross-sectional shape which differs from a true trapezoid shape due to the inward curving of the lines that define the sides of the trapezoid (and most of the trailing edge 608). Optical droplet actuator 670 differs from optical droplet actuator 660 in that the trailing edge 608 does not come to a single vertex, but instead has two vertices which are connected by a straight edge 614. Even so, the trailing edge 608 of optical droplet actuator 670 is tapered, and thus facilitates the narrowing and breaking of the neck of fluid that connects a budding droplet to the droplet reservoir prior to droplet separation and, correspondingly, the formation of droplets having a consistent size. Accordingly, any of optical droplet actuators 600, 620, 630, 640, and 650 could have a "truncated" trailing edge 608 in the manner of optical droplet actuator 670 and still function successfully in the methods disclosed herein.

Optical droplet actuators 660 and 670 illustrate another optional feature of optical droplet actuators in that they have a straight (or substantially straight) leading edge 604. With respect to the formation of droplets of a consistent size, a straight leading edge is not as advantageous as a convex leading edge. Nevertheless, a straight leading edge can be combined with other features, such a tapered trailing edge or curved edges located adjacent to the straight edge (not shown), to produce an optical droplet actuator having a cross-sectional shape suitable for forming droplets of a consistent size according to the methods disclosed herein.

Depending of the embodiment, the size of the cross-sectional shape of an optical droplet actuator (or the cross-sectional area defined by the optical droplet actuator) can be varied to produce droplets of different sizes. In some embodiments, the cross-sectional shape of (or the cross-sectional area defined by) an optical droplet actuator is at least 10,000 microns$^2$ (e.g., at least about 15,000 microns$^2$, at least about 20,000 microns$^2$, at least about 25,000 microns$^2$, at least about 30,000 microns$^2$, at least about 35,000 microns$^2$, at least about 40,000 microns$^2$, at least about 45,000 microns$^2$, at least about 50,000 microns$^2$, at least about 55,000 microns$^2$, at least about 60,000 microns$^2$, at least about 65,000 microns$^2$, at least about 70,000 microns$^2$, at least about 75,000 microns$^2$, at least about 80,000 microns$^2$, at least about 85,000 microns$^2$, at least about 90,000 microns$^2$, at least about 95,000 microns$^2$, at least about 100,000 microns$^2$, at least about 105,000 microns$^2$, at least about 110,000 microns$^2$, at least about 115,000 microns$^2$, at least about 120,000 microns$^2$, at least about 125,000 microns$^2$, at least about 130,000 microns$^2$, at least about 135,000 microns$^2$, at least about 140,000 microns$^2$, at least about 145,000 microns$^2$, at least about 150,000 microns$^2$, at least about 155,000 microns$^2$, at least about 160,000 microns$^2$, at least about 165,000 microns$^2$, at least about 170,000 microns$^2$, at least about 175,000 microns$^2$, at least about 180,000 microns$^2$, at least about 185,000 microns$^2$, at least about 190,000 microns$^2$, at least about 195,000 microns$^2$, at least about 200,000 microns$^2$, at least about 205,000 microns$^2$, at least about 210,000 microns$^2$, at least about 215,000 microns$^2$, at least about 220,000 microns$^2$, at least about 225,000 microns$^2$, at least about 230,000 microns$^2$, at least about 235,000 microns$^2$, at least about 240,000 microns$^2$, at least about 245,000 microns$^2$, at least about 250,000 microns$^2$, at least about 255,000 microns$^2$, at least about 260,000 microns$^2$, at least about 265,000 microns$^2$, at least about 270,000 microns$^2$, at least about 275,000 microns$^2$, at least about 280,000 microns$^2$, at least about 285,000 microns$^2$, at least about 290,000 microns$^2$, at least about 295,000 microns$^2$, at least about 300,000 microns$^2$, or any range defined by two of the foregoing values). In some embodiments, the cross-sectional shape of (or the cross-sectional area defined by) an optical droplet actuator ranges from about 10,000 to about 100,000 microns$^2$, from about 20,000 to about 200,000 microns$^2$, from about 15,000 to about 150,000 microns$^2$, from about 25,000 to about 250,000 microns$^2$, or from about 30,000 to about 300,000 microns$^2$.

Depending on the height of the chamber (or flow region, sequestration pen, or other region) of the microfluidic device in which the droplet reservoir is located, the use of optical droplet actuators having a fixed cross-sectional area can result in droplets of varying volume. For example, for a chamber having a height of 100 microns, a droplet actuator defining a cross-sectional area of 50,000 microns$^2$ would produce an expected droplet size of 5×10$^6$ microns$^3$, or about 5 nL. Similarly, for a chamber having a height of 50 microns, a droplet actuator defining a cross-sectional area of 50,000 microns$^2$ would produce an expected droplet size of 2.5×10$^6$ microns$^3$, or about 2.5 nL. Consistent with the foregoing, the expected volume $V_E$ of a droplet produced using an optical droplet actuator having a cross-sectional area $A_{ODA}$ can be defined by the equation $V_E = A_{ODA} * H_E$. For a microfluidic device having a substrate and a lid that together define a chamber (or other region) height, $H_E$ is the height of the chamber (or other region). For a microfluidic device having a single-sided electrowetting configuration (e.g., a single-sided OEW configuration), $H_E$ is the average height of the top surface of a droplet above the substrate surface. As discussed above, droplets pulled from a droplet reservoir will typically have an actual volume $V_A$ that is greater than the expected volume $V_E$. The size of the cross-sectional area of the optical droplet actuator, as well as other stochastic parameters, alter the extent of the discrepancy between $V_A$ and $V_E$. Accordingly, the relationship between $V_A$ and $V_E$ can be expressed as $V_A = V_E * (1+P)$, where P represents the percentage of expected variance between $V_A$ and $V_E$. More generally, the actual volume $V_A$ of a droplet produced by the methods disclosed herein can be expressed as:

$$V_A = (A_{ODA} * H_E) * (1+P).$$

For any give droplet, P can range from about 0.00 to about 0.25 (e.g., about 0.00 to about 0.05, about 0.00 to about 0.10, about 0.00 to about 0.15, about 0.01 to about 0.05, about 0.01 to about 0.10, about 0.01 to about 0.15, about 0.01 to about 0.20, about 0.02 to about 0.05, about 0.02 to about 0.10, about 0.02 to about 0.15, about 0.02 to about 0.20, about 0.03 to about 0.05, about 0.03 to about 0.10, about 0.03 to about 0.15, about 0.03 to about 0.20, about 0.04 to about 0.05, about 0.04 to about 0.10, about 0.04 to about 0.15, about 0.04 to about 0.20, about 0.05 to about 0.10, about 0.05 to about 0.15, about 0.05 to about 0.20, about 0.05 to about 0.25, about 0.07 to about 0.10, about 0.07 to about 0.15, about 0.07 to about 0.20, about 0.07 to about 0.25, about 0.10 to about 0.15, about 0.10 to about 0.20, about 0.10 to about 0.25, about 0.15 to about 0.20, about 0.15 to about 0.25, or about 0.20 to about 0.25).

In certain embodiments, a droplet produced according to the methods disclosed herein has a volume of at least 1 nL (e.g., at least 2 nL, at least 3 nL, at least 4 nL, at least 5 nL, at least 6 nL, at least 7 nL, at least 8 nL, at least 9 nL, at least 10 nL, at least 11 nL, at least 12 nL, at least 13 nL, at least 14 nL, at least 15 nL, at least 16 nL, at least 17 nL, at least 18 nL, at least 19 nL, at least 20 nL, at least 21 nL, at least 22 nL, at least 23 nL, at least 24 nL, at least 25 nL, at least 26 nL, at least 27 nL, at least 28 nL, at least 29 nL, at least 30 nL, or any range defined by two of the foregoing values). In certain embodiments, a droplet produced according to the methods disclosed herein has a volume ranging from about 1 nL to about 10 nL, about 2 nL to about 20 nL, or about 3 nL to about 30 nL.

During the generation of a child droplet from a droplet reservoir, an optical droplet actuator is projected onto a starting position (e.g., a first position) on a surface of a substrate of the microfluidic device. This position (e.g., first position) can be selected such that it overlaps at least partially with a position on the surface of the substrate that is in contact with the fluid of the droplet reservoir (i.e., a droplet reservoir position). Alternatively, the starting position can be selected such that it is immediately adjacent to or fully overlaps with the droplet reservoir position. After being projected onto the surface of the substrate, the optical droplet actuator is moved away from the droplet reservoir to another position (e.g., a second position), which may be a resting position. Typically, the distance between the starting position and the resting position is sufficiently large so as to ensure that the droplet being pulled by the optical droplet actuator successfully separates from the droplet reservoir. In some embodiments, the starting position and the resting position are separated by a distance of at least 500 microns (e.g., at least 600 microns, at least 700 microns, at least 800 microns, at least 900 microns, at least 1000 microns, at least 1100 microns, at least 1200 microns, at least 1300 microns, at least 1400 microns, at least 1500 microns, or more). The projection of the optical droplet actuator can be moved from the first position to the second position of the substrate along a substantially continuous path. To the extent that the projection is interrupted for any reason, the interruption(s) will typically be for a period of time that is sufficiently short so as to ensure that a budding droplet does not return to the droplet reservoir.

Typically, the light that forms the optical droplet actuator comprises an intensity (i.e., photon flux) that is sufficiently high so as to activate OEW forces at the position on the substrate surface upon which the optical droplet actuator is incident. In certain embodiments, the light intensity of the optical droplet actuator will remain substantially invariant (e.g., having a substantially constant photon flux) during the time period when the optical droplet actuator is being used to pull a droplet from a droplet reservoir. In other embodiments, the intensity of light may be decreased or increased over time, and such variance can be used to provide varying OEW force. In some embodiments, there will be a gradation of light intensities across the cross-sectional shape of the optical droplet actuator, such that there is a different photon flux associated with different regions of the optical droplet actuator. In some embodiments, the gradation of intensities may vary over time from a large gradation to a smaller gradation or no gradation. In addition, the optical droplet actuator may expand to a larger cross-sectional area over time, which can actuate a stronger OEW force on the droplet. The optical droplet actuator may retain the same geometry as it expands or it may alter its geometry as it expands.

In addition, an optical droplet actuator used to pull a child droplet away from a droplet reservoir may alter its geometry in relation to its position with respect to the reservoir droplet. For example, in some embodiments, a small optical droplet actuator may be projected immediately adjacent to a droplet reservoir and then "grow" into a larger optical droplet actuator as the droplet buds from the droplet reservoir. In other embodiments, a tapered portion of an optical droplet actuator may be elongated and narrowed as the optical droplet actuator moves away from the reservoir droplet and the neck of fluidic medium expands and breaks. In some instances, the optical droplet actuator used to pull the child droplet may be elongated and narrowed based on visual feedback of the reservoir droplet, the child droplet, and the neck of fluid between the reservoir and child droplets. The ability to interactively conform the optical droplet actuator(s) to the neck of fluidic media created by the droplet being generated from the reservoir droplet allows for stable and controlled droplet generation when different aspects of the system are unknown (e.g. droplet viscosity, surface tension, etc.).

In some embodiments, the optical droplet actuator is moved away from the reservoir droplet at a constant velocity. In other embodiments, the velocity of the optical droplet actuator is "ramped" up from an initial velocity to a travelling velocity. Likewise, the velocity of the optical droplet actuator can be "ramped down" before the droplet separates from the reservoir droplet.

The fluid in the droplet reservoir, and thus in any child droplets pulled from the reservoir, is typically and aqueous fluid, which may be an aqueous solution, optionally containing ions, proteins, lipids, carbohydrates, surfactants, and combinations thereof, including culture media, buffers, lysis solutions, and other solutions suitable for nucleic acid capture, tagging, and/or amplification.

In order for an optical droplet actuator to function effectively and produce droplets of consistent size, a force must typically be applied to the droplet reservoir so as to prevent the droplet reservoir from being pulled along by the optical droplet actuator. The force can be an electrowetting force, which can be light actuated (i.e., an OEW force), electrically actuated (i.e., as in EWOD), or a combination thereof. The electrowetting force can be applied so as to maintain the droplet reservoir in a stationary position (i.e., to "pin" the droplet reservoir), or it can be applied so as to move the droplet reservoir in a direction other than the direction of movement of the optical droplet actuator. Alternatively, or in addition, the droplet reservoir can be pinned to a fixed location via its interaction with discrete functionalized surfaces located within the microfluidic device. Such discrete functionalized surfaces can be produced by applying a large electrical potential (e.g., about 45 to 50 Volts) across the microfluidic device while an aqueous droplet is resting on the fixed location. Formation of a discrete functionalized surface in this manner has been described, for example, in U.S. patent application Ser. No. 15/336,768, filed Oct. 27, 2016, the contents of which are incorporated herein by reference in their entirety. Alternatively, surfaces within the microfluidic device can be selectively functionalization via the formation of hydrogel barriers/walls within the microfluidic device. The formation of hydrogel barriers within a microfluidic device has been described, for example, is U.S.

patent application Ser. No. 15/359,115, filed Nov. 22, 2016, the contents of which are incorporated herein by reference in their entirety. In still other embodiments, the droplet reservoir can be held in place with a valve that creates an opposing force on the fluid of the reservoir.

When EW forces are used to pin the droplet reservoir, the EW force can be applied over an area of at least 20,000 microns$^2$ (e.g., at least 40,000 microns$^2$, at least 50,000 microns$^2$, at least 60,000 microns$^2$, at least 70,000 microns$^2$, at least 80,000 microns$^2$, at least 100,000 microns$^2$, at least 120,000 microns$^2$, at least 140,000 microns$^2$, at least 150,000 microns$^2$, at least 160,000 microns$^2$, at least 180,000 microns$^2$, at least 200,000 microns$^2$, at least 220,000 microns$^2$, at least 240,000 microns$^2$, at least 250,000 microns$^2$, at least 260,000 microns$^2$, at least 280,000 microns$^2$, at least 300,000 microns$^2$, at least 320,000 microns$^2$, at least 350,000 microns$^2$, at least 360,000 microns$^2$, at least 400,000 microns$^2$, at least 450,000 microns$^2$, at least 480,000 microns2, at least 500,000 microns$^2$, at least 550,000 microns$^2$, at least 560,000 microns$^2$, at least 600,000 microns$^2$, at least 640,000 microns$^2$, at least 700,000 microns$^2$, at least 800,000 microns$^2$, at least 900,000 microns$^2$, at least 960,000 microns$^2$, at least 1.00×10$^6$ microns$^2$, at least 1.12×10$^6$ microns2, at least 1.25×10$^6$ microns$^2$, at least 1.28×10$^6$ microns$^2$, at least 1.44×10$^6$ microns$^2$, at least 1.60×10$^6$ microns$^2$, or any range defined by two of the foregoing values. In certain embodiments, the EW force can be applied primarily around the edges of the droplet reservoir (e.g., such that there is a region in the center of the droplet reservoir that does not experience the EW force). In such embodiments, the EW force can "circumscribe" an area of at least 20,000 microns$^2$, or any other value or range set forth above.

The area over which the EW force is applied to the droplet reservoir is typically smaller than the area on the surface of the substrate of the microfluidic device that is contacted by the droplet reservoir. This allows for "excess" fluid in the droplet reservoir to be more readily pulled away from the droplet reservoir by the optical droplet actuator. In certain embodiments, the EW force used to pin the droplet reservoir circumscribes an area corresponding to at least 40% of the area on the surface of the substrate contacted by the droplet reservoir. In some related embodiments, the EW force used to pin the droplet reservoir circumscribes an area corresponding to at least 45%, at least 50%, at least 55%, at least 60%, at least 65%, at least 70%, at least 75%, at least 80%, at least 85%, at least 88%, at least 90%, at least 91%, at least 92%, at least 93%, at least 94%, at least 95%, at least 96%, at least 97%, at least 98%, at least 98.5%, at least 99.0%, at least 99.2%, at least 99.3%, at least 99.4%, at least 99.5%, at least 99.6%, at least 99.7%, or at least 99.8% of the area on the surface of the substrate contacted by the droplet reservoir. Moreover, the EW force used to pin the droplet reservoir can circumscribe an area corresponding to any range defined by two of the foregoing values. Typically, the percentage of area circumscribed by the EW force increases as the volume of the droplet reservoir increases relative to the size of the first droplet.

Figure 7A:
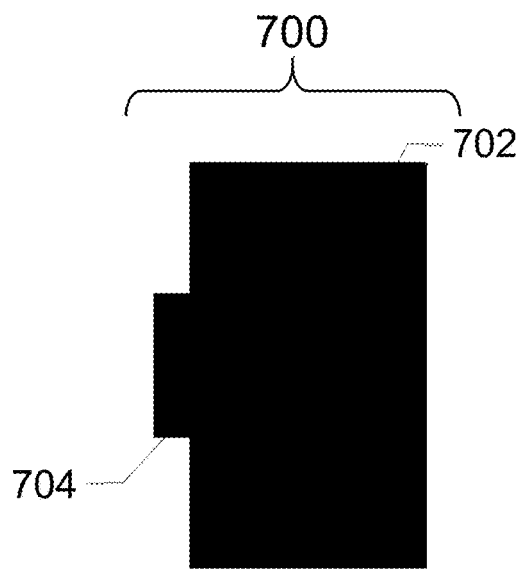
FIGS. 7A-7C illustrate patterns for the application of electrowetting (EW) force to a reservoir droplet, to thereby pin the reservoir droplet according to various embodiments of the invention.
Figure 7B:
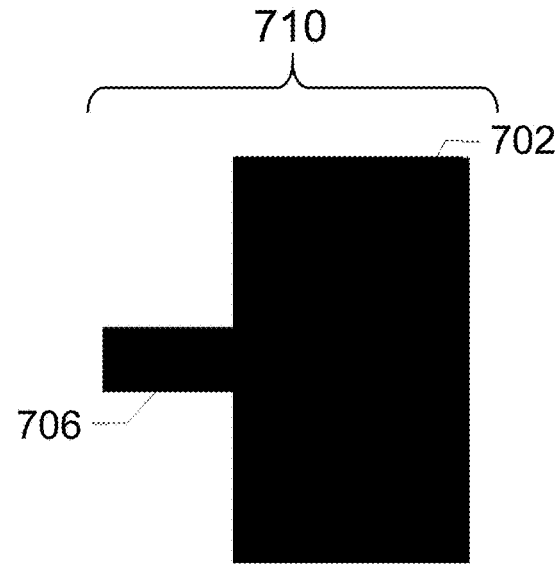
Figure 7C:
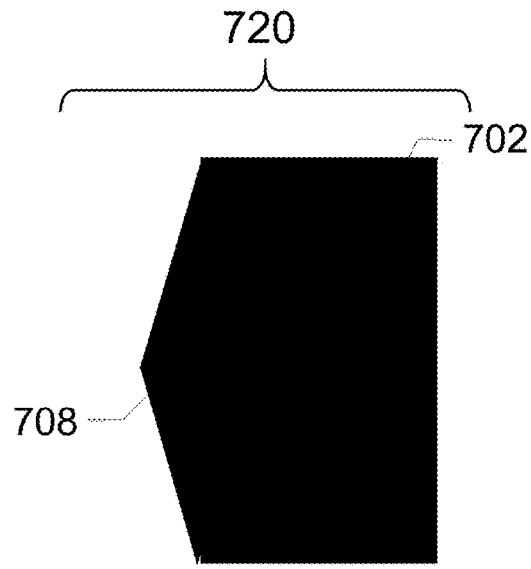

In the embodiments depicted in FIGS. 4A-D, an electrowetting force having a rectangular shape 490 (in this case a light-actuate OEW force) is used to pin the droplet reservoir to a fixed location within the microfluidic device. As discussed above, the droplet reservoir 480, 485 contacts an area on the surface of the substrate that greater than the area covered by the electrowetting force. Of course, the shape of the area over which the electrowetting force is applied can be any of a range of different shapes. Examples of such different shapes are provided in FIGS. 7A-7C. Specifically, FIGS. 7A-7B illustrate areas 700, 710 that are rectangular 702 with rectangular protrusions 704, 706. Pulling droplets from the rectangular protrusions 704, 706 (as opposed to a flat side of rectangle 702) is beneficial in narrowing and breaking the neck of fluid that connects the child droplet to the droplet reservoir. As discussed above, visual feedback may be used to alter the geometry of the area over which electrowetting force is applied in order to pin a droplet reservoir droplet. In some instances, the protrusion may be lengthened as a droplet is pulled from the droplet reservoir. For example, the protrusion 704 of area 700 in FIG. 7A may be lengthened to generate the protrusion 706 of area 710 in FIG. 7B.

Droplet reservoirs may contain sufficient fluid to generate 3, 4, 5, 6, 7, 8, 9, 10, 15, 20, 25, 30, 35, 40, 45, 50, or more droplets. In some embodiments, the droplet reservoir can include at least 2.5 nL of fluid (e.g., at least 5 nL, at least 10 nL, at least 15 nL, at least 20 nL, at least 25 nL, at least 30 nL, at least 40 nL, at least 50 nL, at least 60 nL, at least 70 nL, at least 80 nL, at least 90 nL, at least 100 nL, at least 125 nL, at least 150 nL, at least 175 nL, at least 200 nL, at least 250 nL, at least 300 nL, at least 400 nL, at least 500 nL, or any range defined by two of the foregoing values). In some embodiments, the the droplet reservoir can include about 5 nL to about 50 nL, about 10 nL to about 100 nL, about 15 nL to about 150 nL, about 20 nL to about 200 nL, or about 50 nL to about 500 nL. Droplet reservoirs may be created using a variety of techniques that are known in the art. In some embodiments, an optical droplet actuator is used to generate the droplet reservoir (e.g., from a larger droplet). The generation of a reservoir droplet and use of the reservoir droplet to generate child droplets may be performed iteratively. For example, a child droplet generated from a reservoir droplet may be used itself as a droplet reservoir in order to generate child droplets of a smaller volume. This process may be iterated a number of times using incrementally smaller optical droplet actuators to generate incrementally smaller child droplets.

Figure 5A:
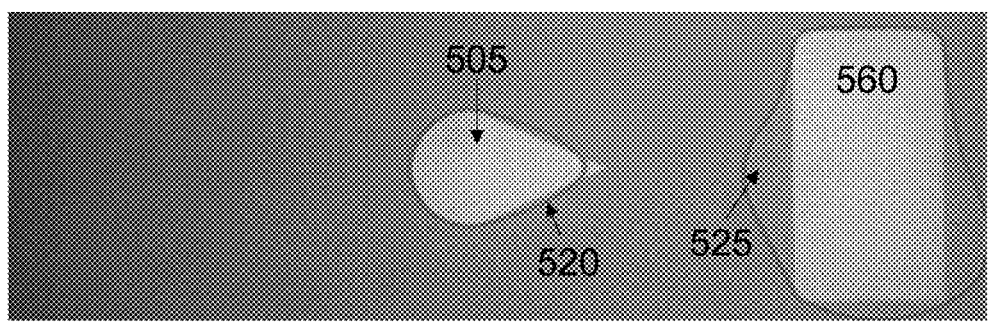
FIG. 5A-5C depict the modification of the size and shape of an area over which an electrowetting (EW) force is applied within a microfluidic device to pin a droplet reservoir as child droplets are pulled from the droplet reservoir according to some embodiments of the invention.
Figure 5B:
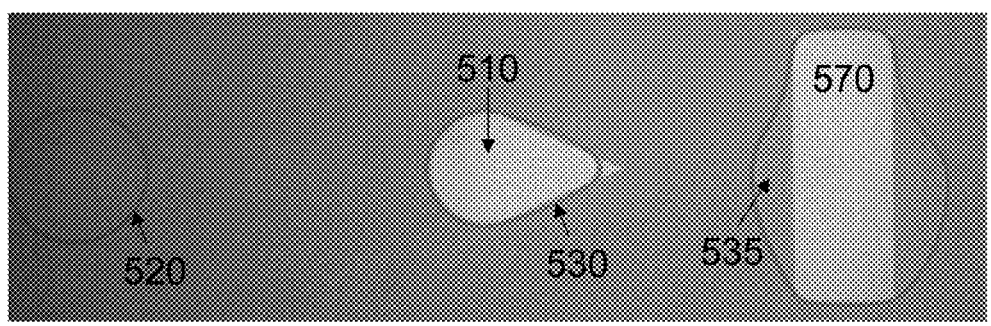
Figure 5C:
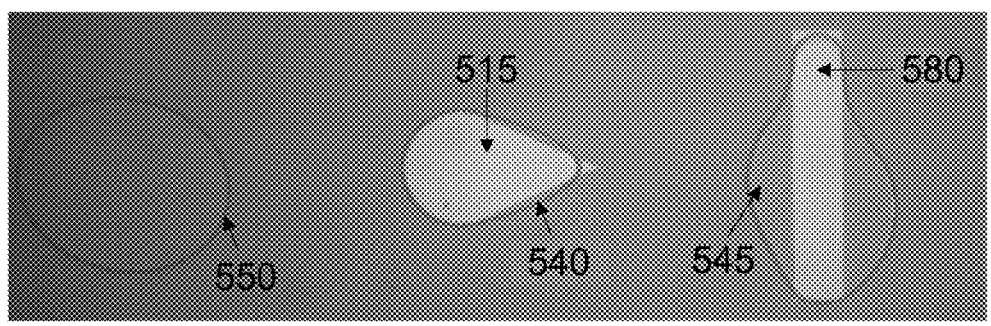

The size and shape of the area over which electrowetting force is applied to a droplet reservoir may be altered over time as the volume of the reservoir droplet decreases during child droplet generation. FIG. 5A-5C depict how the area 560, 570, 580 over which electrowetting force is applied to the droplet reservoir 525, 535, 545 is reduced over time as droplets 520, 530, 540 are pulled from the droplet reservoirs 525, 535, 545, by optical droplet actuators 505, 510, 515.

Storage Devices. In certain embodiments, the invention further provides machine-readable storage devices for storing non-transitory machine readable instructions for carrying out the foregoing methods. The machine-readable instructions can further control the imaging device used to obtain the images.

Systems for Directing Droplet Generation. In certain embodiments, systems configured to generate droplets of aqueous fluid within a microfluidic device are provided. The systems can include: a nest; a structured light modulator (SLM); an optical train; and a controller comprising a processor and a memory. Each of these elements—the nest, SLM, optical train, and controller—can be configured as described herein or in the art (e.g., in U.S. Patent Application Publication No. 2016/0193604, the contents of which are incorporated herein by reference in their entirety). In particular, the nest can be configured to support the microfluidic device and, optionally, to electrically couple with and apply an electrical potential across the microfluidic device. The optical train can be configured to receive light from the SLM and project an optical droplet actuator onto a surface of a substrate of the microfluidic device when the microfluidic device is supported by the nest. The memory of the controller can include machine-readable instructions for carrying out the steps of any one of the methods disclosed herein, and the processor of the controller can be configured to read the machine-readable instructions from the memory and, in accordance with the instructions, direct the SLM to project an optical droplet actuator onto a first position on a surface of a substrate of the microfluidic device and move the projection of the optical droplet actuator from the first position to a second position on the surface of the substrate of the microfluidic device. The controller can be further configured to receive user input, for example, regarding the electrical potential applied across the microfluidic device, and selection of the first and/or second positions.

The systems can further comprise an imaging device configured to provide an image of at least a portion of the microfluidic device comprising a droplet reservoir. For systems having an imaging device, the processor can be configured to receive the image of the portion of the microfluidic device, identify a position on the surface of the substrate of the microfluidic device that is in contact with an aqueous fluid of the droplet reservoir, and select the first position to at least partially overlap with a portion of the identified position. In addition, the processor can be designed to estimate an area on the surface of the substrate contacted by the droplet reservoir and, based upon the estimate, actuate an electrowetting (EW) force within the microfluidic device to pin the droplet reservoir. The EW force used to pin the droplet reservoir can circumscribe an area that is smaller than the area of the substrate surface contacted by the droplet reservoir, as discussed above. Moreover, the processor can be configured to dynamically adjust the EW force used to pin the droplet reservoir as a first droplet is separated from the droplet reservoir or after the first droplet is separated from the droplet reservoir and before a second droplet is separated from the droplet reservoir; and/or to dynamically adjust a cross-sectional size of the optical droplet actuator as a first droplet is separated from the droplet reservoir.

The electrical potential applied by the system to the microfluidic device can comprise a peak-to-peak voltage of about 20 Vppk to about 45 Vppk. (e.g., about 10 Vppk to about 25 Vppk, about 15 Vppk to about 30 Vppk, about 20 Vppk to about 35 Vppk, about 25 Vppk to about 40 Vppk, or any ranged defined by two of the foregoing values. The applied potential can comprise a frequency of about 10 kHz to about 100 kHz (e.g., about 10 kHz to about 30 kHz, about 15 kHz to about 35 kHz, about 20 kHz to about 40 kHz, about 25 kHz to about 45 kHz, about 30 kHz to about 50 kHz, about 35 kHz to about 55 kHz, about 40 kHz to about 60 kHz, about 45 kHz to about 65 kHz, about 50 kHz to about 70 kHz, about 55 kHz to about 75 kHz, about 60 kHz to about 80 kHz, about 65 kHz to about 85 kHz, about 70 kHz to about 90 kHz, about 75 kHz to about 95 kHz, about 80 kHz to about 100 kHz, or any range defined by two of the foregoing end points).

EXAMPLES

Example 1

Droplet Generation in a Microfluidic Device

A microfluidic device having an optoelectrowetting (OEW) configuration (Berkeley Lights, Inc.) was used to generate droplets. The device included an approximately 1 micron thick slab of amorphous silicon (aSi:H), a 100 nm thick layer of aluminum oxide (deposited by ALD) applied to the slab of amorphous silicon, and a hydrophobic layer assembled from linear hydrocarbon molecules having a C18 chain length covalently attached to the outer surface of the aluminum oxide layer. An electrical potential of 24 Vppk at 30 kHz was applied to the chip. The droplet reservoir included 5 mg/ml of bovine serum albumin (BSA) in 1× phosphate buffered saline (PBS), with 0.2% surfactant (both Tripod and Tet were tested with similar results).

As shown in FIGS. 4A-4D, a tear drop shaped droplet actuator 450, 455 was successfully used to pull child droplets 460, 465 from droplet reservoir 480, 485. In FIGS. 4A-4B, an optical droplet actuator corresponding to an expected volume $V_E$ of 5.2 nL resulted in the production of a child droplet having an actual volume $V_A$ of 6.0 nL. In FIGS. 4C-4D, an optical droplet actuator corresponding to an expected volume $V_E$ of 5.2 nL resulted in the production of a child droplet having an actual volume $V_A$ of 5.8 nL.

Example 2

Droplet Generation in a Microfluidic Device

A microfluidic device having an optoelectrowetting (OEW) configuration (Berkeley Lights, Inc.) was used to generate droplets. The device included an approximately 1 micron thick slab of amorphous silicon (aSi:H), a 100 nm thick layer of aluminum oxide (deposited by ALD) applied to the slab of amorphous silicon, and a hydrophobic layer assembled from linear hydrocarbon molecules having a C18 chain length covalently attached to the outer surface of the aluminum oxide layer. An electrical potential of 24 Vppk at 30 kHz was applied to the chip. The droplet reservoir included 5 mg/ml of bovine serum albumin (BSA) in 1× phosphate buffered saline (PBS), with 0.2% surfactant (both Tripod and Tet were tested with similar results).

As shown in FIGS. 5A-5C, a tear drop shaped droplet actuator 505, 510, 515 was successfully used to pull child droplets 520, 530, 540 from droplet reservoirs 560, 570, 580. Over the course of the experiment, the area over which electrowetting force (in this case OEW force) was applied to the droplet reservoir was decreased as child droplets were withdrawn from the reservoir. In each of FIGS. 5A-5C, an optical droplet actuator 520, 530, 540 corresponding to an expected volume $V_E$ of 5.2 nL was used. The resulting droplets 505, 510, 515 had an actual volume $V_A$ of 5.6, 5.4, and 5.7 nL, respectively.

Listing of Embodiments

1. A method of generating a droplet in a microfluidic device including a substrate and an optoelectrowetting (OEW) configuration, the method including: applying an electrowetting (EW) force to a droplet reservoir disposed within the microfluidic device, wherein the droplet reservoir includes an aqueous fluid, projecting an optical droplet actuator onto a first position on a surface of the substrate of the microfluidic device, where the first position overlaps at least partially with a position on the surface of the substrate that is in contact with the aqueous fluid of the droplet reservoir; and moving the projection of the optical droplet actuator to a second position on the surface of the substrate of the microfluidic device, where the second position is a sufficient distance away from the first position so as to cause a first droplet of the aqueous fluid to separate from the droplet reservoir, wherein, prior to moving the projection of the optical droplet actuator to the second position on the substrate, the droplet reservoir contains a volume of aqueous fluid equal to or greater than twice the volume of the first droplet.

2. The method of embodiment 1, where the first droplet may have a volume $V_1$ that is proportional to a cross-sectional area $A_{ODA}$ defined by the optical droplet actuator.

3. The method of embodiment 2, where the volume $V_1$ may be provided by the equation:

$$V_1 = (A_{ODA}*H)*(1+P_1),$$

where H is a cross-sectional height of a chamber in the microfluidic device in which the droplet reservoir is disposed, and where P1 ranges from 0.00 to 0.25.

4. The method of embodiment 2 or 3, where the cross-sectional area $A_{ODA}$ may be at least 10,000 microns$^2$.

5. The method of embodiment 4, where the cross-sectional area $A_{ODA}$ may be about 25,000 to about 250,000 microns$^2$.

6. The method of embodiment 1, where the first droplet may have a volume $V_1$ of at least 1 nL.

7. The method of embodiment 6, where the volume V1 may be about 2 nL to about 10 nL.

8. The method of any one of embodiments 1 to 7, where the optical droplet actuator may include a first portion having a leading edge and a second portion having a trailing edge.

9. The method of embodiment 8, where the leading edge of the first portion may be convex.

10. The method of embodiment 8, where the leading edge of the first portion may be substantially straight.

11. The method of any one of embodiments 8 to 10, where the second portion may be tapered.

12. The method of embodiment 11, where the trailing edge of the second portion may taper to a single vertex.

13. The method of embodiment 11 or 12, where a length of the second portion may range from about 100 microns to about 1000 microns.

14. The method of any one of embodiments 8 to 13, where the first portion and the second portion of the optical droplet actuator may be portions of a single contiguous optical droplet actuator.

15. The method of any one of embodiments 8 to 13, wherein the first portion and the second portion of the optical droplet actuator may be separate portions of a composite optical droplet actuator.

16. The method of any one of embodiments 1 to 15, where the projection of the optical droplet actuator may be moved from the first position to the second position of the substrate along a substantially continuous path.

17. The method of any one of embodiments 1 to 16, where the first position and the second position may be separated by a distance of at least 500 microns.

18. The method of any one of embodiments 1 to 17, where the droplet reservoir may include a volume of the aqueous fluid of at least 2.5 nL.

19. The method of any one of embodiments 1 to 18, where applying an EW force to the droplet reservoir may include applying an OEW force.

20. The method of any one of embodiments 1 to 19, wherein applying an EW force to the droplet reservoir may include applying an EWOD force.

21. The method of embodiment 19 or 20, where the EW force applied to the droplet reservoir may circumscribe an area of at least 50,000 microns$^2$.

22. The method of any one of embodiments 1 to 21, where at least a portion of the EW force applied to the droplet reservoir may remain in a stationary position as the optical droplet actuator is moved toward the second position and away from the droplet reservoir.

23. The method of any one of embodiments 1 to 22, further including: modifying the optical droplet actuator responsive to generating the first droplet, where modifying the first optical droplet actuator may include reducing the area circumscribed by the EW force while the projection of the optical droplet actuator is moved toward the second position and away from the droplet reservoir or after the projection of the optical droplet actuator has reached the second position.

24. The method of any one of embodiments 1 to 23, where at least one surface of the microfluidic device that is in contact with the droplet reservoir may be hydrophilic or includes a hydrophilic coating.

25. The method of any one of embodiments 1 to 24, where applying the EW force to the droplet reservoir may include applying an electrical potential across opposing electrodes of the microfluidic device, where the electrical potential has a voltage of about 20 Vppk to about 45 Vppk.

26. The method of embodiment 25, where the applied electrical potential may have a current having a frequency of about 10 kHz to about 100 kHz.

27. The method of any one of embodiments 1 to 26, further including: applying an EW force to a second droplet reservoir including the aqueous fluid; projecting a second optical droplet actuator onto a third position on the surface of the substrate of the microfluidic device, where the third position may overlap at least partially with a position on the surface of the substrate that is in contact with the aqueous fluid of the second droplet reservoir; and moving the projection of the second optical droplet actuator to a fourth position on the surface of the substrate of the microfluidic device, where the fourth position may be a sufficient distance away from the third position so as to cause a second droplet of the aqueous fluid to separate from the droplet reservoir.

28. The method of embodiment 27, where the second droplet reservoir may be the remainder of the first droplet reservoir after separation of the first droplet of aqueous fluid.

29. The method of embodiment 28, where the third position on the surface of the substrate may be the same as the first position on the surface of the substrate.

30. The method of embodiment 28 or 29, where the fourth position on the surface of the substrate may be the same as the second position on the surface of the substrate.

31. The method of any one of embodiments 27 to 30, where the second droplet may have substantially the same volume as the first droplet.

32. The method of embodiment 27, where the first droplet of aqueous liquid may be the second droplet reservoir.

33. The method of any one of embodiments 1 to 32, where the aqueous fluid of the droplet reservoir may include a surfactant.

34. The method of embodiment 33, where the surfactant may be selected from the group consisting of N-(1,3-bis (Glucopyranoside)propan-2-yl)-3-Butyl-3-Phenylheptanamide and 2,4,7,9-Tetramethyl-5-decyne-4,7-diol ethoxylate (Tet).

35. A method of generating droplets in a microfluidic device including a substrate and an optoelectrowetting (OEW) configuration, the method including: applying an electrowetting (EW) force to a droplet reservoir disposed within the microfluidic device, where the droplet reservoir includes an aqueous fluid; projecting a first optical droplet actuator onto a first position on a surface of the substrate of the microfluidic device, where the first position overlaps at least partially with a position on the surface of the substrate that is in contact with the aqueous fluid of the droplet reservoir; moving the projection of the first optical droplet actuator to a second position on the surface of the substrate of the microfluidic device, where the second position is a sufficient distance away from the first position so as to cause a first droplet of the aqueous fluid to separate from the droplet reservoir; projecting a second optical droplet actuator onto a third position on the surface of the substrate of the microfluidic device, where the third position overlaps at least partially with a position on the surface of the substrate that is in contact with the aqueous fluid of the droplet reservoir; and moving the projection of the third optical droplet actuator to a fourth position on the surface of the substrate of the microfluidic device, where the fourth position is a sufficient distance away from the third position so as to cause a second droplet of the aqueous fluid to separate from the droplet reservoir, where the second droplet has substantially the same volume of aqueous fluid as the first droplet.

36. The method of embodiment 35, where each of the first droplet and the second droplet may have a volume of aqueous fluid ranging from about 2 nL to about 10 nL.

37. The method of embodiment 35 or 36, where the aqueous fluid of the droplet reservoir may include a surfactant.

38. The method of embodiment 37, where the surfactant may be selected from the group consisting of N-(1,3-bis(Glucopyranoside)propan-2-yl)-3-Butyl-3-Phenylheptanamide and 2,4,7,9-Tetramethyl-5-decyne-4,7-diol ethoxylate (Tet).

39. A system configured to generate droplets of aqueous fluid within a microfluidic device, the system including: a nest; a structured light modulator (SLM); an optical train; and a control module including a digital processor and a digital memory, where the nest is configured to support the microfluidic device; where the optical train is configured to receive light from the SLM and project an optical droplet actuator onto a surface of a substrate of the microfluidic device when the microfluidic device is supported by the nest; where the digital memory of the control module includes non-transitory machine readable instructions for carrying out the steps of any one of the methods of embodiments 1 to 38; and where the processor of the controller is configured to read the machine-readable instructions from the memory and, in accordance with the instructions, direct the SLM to project an optical droplet actuator onto a first position on a surface of a substrate of the microfluidic device and move the projection of the optical droplet actuator from the first position to a second position on the surface of the substrate of the microfluidic device.

40. The system of embodiment 39, where the nest may be further configured to electrically couple with and apply an electrical potential across the microfluidic device.

41. The system of embodiment 40, where the digital processor may be configured to direct the nest to apply the potential across the microfluidic device.

42. The system of embodiment 41, where the digital processor may be configured to receive user input to determine the voltage potential to apply across the microfluidic device.

43. The system of any one of embodiments 39 to 42, where the system may further include an imaging device configured to provide a digital image of at least a portion of the microfluidic device including a droplet reservoir.

44. The system of embodiment 43, where the digital processor may be configured to receive the digital image of the portion of the microfluidic device, analyze the image to identify a position on the surface of the substrate of the microfluidic device that is in contact with an aqueous fluid of the droplet reservoir, and select the first position such that the first position may at least partially overlap with a portion of the identified position that is in contact with the aqueous fluid.

45. The system of embodiment 43, where the digital processor may be configured to receive user input to select the first position.

46. The system of embodiment 44 or 45, where the digital processor may be configured to receive user input to select the second position.

47. The system of any one of embodiments 44 to 46, where the digital processor may be further configured to estimate an area of the surface of the substrate contacted by the droplet reservoir and, based upon the estimate, actuate an electrowetting (EW) force within the microfluidic device to pin the droplet reservoir.

48. The system of embodiment 47, where the EW force used to pin the droplet reservoir may circumscribe an area corresponding to at least 40% of the area of the surface of the substrate contacted by the droplet reservoir.

49. The system of embodiment 47 or 48, where the digital processor may be configured to dynamically adjust the EW force used to pin the droplet reservoir as a first droplet is separated from the droplet reservoir or after the first droplet is separated from the droplet reservoir and before a second droplet is separated from the droplet reservoir.

50. The system of any one of embodiments 39 to 49, where the digital processor may be configured to dynamically adjust a cross-sectional size of the optical droplet actuator as a first droplet is separated from the droplet reservoir.

The foregoing written specification details various embodiments and is considered to be sufficient to enable one skilled in the art to practice the embodiments. It will be appreciated, however, that no matter how detailed the foregoing may appear in text, the embodiments may be practiced in many ways and should be construed in accordance with the appended claims and any equivalents thereof.

What is claimed:

1. A method of generating a droplet in a microfluidic device comprising a substrate and an optoelectrowetting (OEW) configuration, the method comprising:
    applying a first electrowetting (EW) force to a droplet reservoir disposed within the microfluidic device, wherein the droplet reservoir comprises an aqueous fluid;
    projecting an optical droplet actuator, wherein the optical droplet actuator comprises a projected pattern of light sufficient to activate a second electrowetting force, onto a first position on a surface of the substrate of the microfluidic device, wherein the first position overlaps at least partially with a position on the surface of the substrate that is in contact with the aqueous fluid of the droplet reservoir; and
    moving the projection of the optical droplet actuator to a second position on the surface of the substrate of the microfluidic device, wherein the second position is a sufficient distance away from the first position so as to cause a first droplet of the aqueous fluid to separate away from the droplet reservoir, wherein, prior to moving the projection of the optical droplet actuator to the second position on the substrate, the droplet reservoir contains a volume of aqueous fluid equal to or greater than twice the volume of the first droplet.

2. The method of claim 1, wherein the first droplet has a volume $V_1$ that is proportional to a cross-sectional area $A_{ODA}$ defined by the optical droplet actuator.

3. The method of claim 2, wherein the volume $V_1$ is provided by the equation:

$$V_1 = (A_{ODA} * H_E) * (1 + P_1),$$

wherein H is a cross-sectional height of a chamber in the microfluidic device in which the droplet reservoir is disposed, and wherein P1 ranges from 0.00 to 0.25.

4. The method of claim 3, wherein the cross-sectional area AODA is about 25,000 to about 250,000 microns.

5. The method of claim 1, wherein the first droplet has a volume $V_1$ of at least 1 nL to about 10 nL.

6. The method of claim 1, wherein the optical droplet actuator comprises a first portion having a leading edge and a second portion having a trailing edge.

7. The method of claim 6, wherein the leading edge of the first portion is convex or the leading edge of the first portion is substantially straight.

8. The method of claim 6, wherein the second portion is tapered or the trailing edge of the second portion tapers to a single vertex.

9. The method of claim 8, wherein a length of the second portion ranges from about 100 microns to about 1000 microns.

10. The method of claim 6, wherein the first portion and the second portion of the optical droplet actuator are portions of a single contiguous optical droplet actuator.

11. The method of claim 6, wherein the first portion and the second portion of the optical droplet actuator are separate portions of a composite optical droplet actuator.

12. The method of claim 1, wherein the droplet reservoir comprises a volume of the aqueous fluid of at least 2.5 nL.

13. The method of claim 1, wherein at least a portion of the EW force applied to the droplet reservoir remains in a stationary position as the optical droplet actuator is moved toward the second position and away from the droplet reservoir.

14. The method of claim 1, further comprising:
modifying the optical droplet actuator responsive to generating the first droplet, wherein modifying the first optical droplet actuator comprises expanding the area circumscribed by the projection of the optical droplet actuator while the projection of the optical droplet actuator is moved toward the second position and away from the droplet reservoir or after the projection of the optical droplet actuator has reached the second position.

15. The method of claim 1, wherein applying the EW force to the droplet reservoir comprises applying an electrical potential across opposing electrodes of the microfluidic device, wherein the electrical potential has a voltage of about 20 Vppk to about 45 Vppk.

16. The method of claim 15, wherein the applied electrical potential has a current having a frequency of about 10 kHz to about 100 kHz.

17. The method of claim 1, wherein the aqueous fluid of the droplet reservoir comprises a surfactant, wherein the surfactant is selected from the group consisting of N-(1,3-bis(Glucopyranoside)propan-2-yl)-3-Butyl-3-Phenylheptanamide and 2, 4, 7, 9-Tetramethyl-5-decyne-4,7-diol ethoxylate.

18. A system configured to generate droplets of aqueous fluid within a microfluidic device, the system comprising:
a nest;
a structured light modulator (SLM);
an optical train; and
a control module comprising a digital processor and a digital memory,
wherein the nest is configured to support the microfluidic device;
wherein the optical train is configured to receive light from the SLM and project an optical droplet actuator onto a surface of a substrate of the microfluidic device when the microfluidic device is supported by the nest;
wherein the digital memory of the control module comprises non-transitory machine readable instructions for carrying out the steps of the method of claim 1; and
wherein the processor of the controller is configured to read the machine-readable instructions from the memory and, in accordance with the instructions, direct the SLM to project an optical droplet actuator onto a first position on a surface of a substrate of the microfluidic device and move the projection of the optical droplet actuator from the first position to a second position on the surface of the substrate of the microfluidic device.

19. The system of claim 18, wherein the nest is further configured to electrically couple with and apply an electrical potential across the microfluidic device.

20. The system of claim 19, wherein the digital processor is configured to direct the nest to apply the potential across the microfluidic device, and wherein the digital processor is configured to receive user input to determine the voltage potential to apply across the microfluidic device.

21. The system of claim 18, further comprising an imaging device configured to provide a digital image of at least a portion of the microfluidic device comprising a droplet reservoir.

22. The system of claim 21, wherein the digital processor is configured to receive the digital image of the portion of the microfluidic device, analyze the image to identify a position on the surface of the substrate of the microfluidic device that is in contact with an aqueous fluid of the droplet reservoir, and select the first position such that the first position at least partially overlaps with a portion of the identified position that is in contact with the aqueous fluid.

23. The system of claim 21, wherein the digital processor is configured to receive user input to select the first position.

24. The system of claim 22, wherein the digital processor is further configured to estimate an area of the surface of the substrate contacted by the droplet reservoir and, based upon the estimate, actuate an electrowetting (EW) force within the microfluidic device to pin the droplet reservoir.

25. The system of claim 24, wherein the digital processor is configured to dynamically adjust the EW force used to pin the droplet reservoir as a first droplet is separated from the droplet reservoir or after the first droplet is separated from the droplet reservoir and before a second droplet is separated from the droplet reservoir.

26. The system of claim 18, wherein the digital processor is configured to dynamically adjust a cross-sectional size of the optical droplet actuator as a first droplet is separated from the droplet reservoir.

* * * * *

UNITED STATES PATENT AND TRADEMARK OFFICE
CERTIFICATE OF CORRECTION

PATENT NO. : 10,766,033 B2　　　　　　　　　　　　　　　　　　　　　　Page 1 of 1
APPLICATION NO. : 16/024624
DATED : September 8, 2020
INVENTOR(S) : X. Robert Bao, Jason M. McEwen and Brian A. Rabkin It is certified that error appears in the above-identified patent and that said Letters Patent is hereby corrected as shown below:

In the Claims

Claim 4, Column 57, Line 18; delete "AODA" and insert therefor --$A_{ODA}$-- and after "250,000", delete "microns" and insert therefor --microns$^2$--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*